US008954532B2

(12) United States Patent
Tanaka et al.

(10) Patent No.: US 8,954,532 B2
(45) Date of Patent: Feb. 10, 2015

(54) COMMUNICATION SYSTEM DETERMINING EFFECTIVE REMAINING TRANSMISSION RATE USING SMALL-SIZED TEST DATA BEFORE TRANSMITTING ACTUAL DATA

(71) Applicant: Panasonic Intellectual Property Management Co., Ltd., Osaka (JP)

(72) Inventors: Osamu Tanaka, Osaka (JP); Hiroyuki Watanabe, Osaka (JP); Toyoshi Yamada, Osaka (JP); Nobuhiko Arashin, Osaka (JP); Masahiko Nagoshi, Osaka (JP); Kazuaki Inokuchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 233 days.

(21) Appl. No.: 13/670,800

(22) Filed: Nov. 7, 2012

(65) Prior Publication Data

US 2013/0060898 A1    Mar. 7, 2013

Related U.S. Application Data

(63) Continuation of application No. PCT/JP2012/000837, filed on Feb. 8, 2012.

(30) Foreign Application Priority Data

Feb. 10, 2011    (JP) .................. 2011-026825

(51) Int. Cl.
    G06F 15/16      (2006.01)
    H04L 12/815     (2013.01)
    H04L 29/06      (2006.01)

(52) U.S. Cl.
    CPC ............... H04L 47/22 (2013.01); H04L 69/16 (2013.01)
    USPC ........... 709/217; 709/203; 709/231; 709/232; 709/233; 370/230; 370/244; 370/352

(58) Field of Classification Search
    USPC .......... 709/203, 217, 231–233; 370/230, 244, 370/352–359
    See application file for complete search history.

(56) References Cited

U.S. PATENT DOCUMENTS

| 7,693,155 | B2 | 4/2010 | Igarashi |
| 2006/0153087 | A1* | 7/2006 | Kang ............................. 370/244 |
| 2007/0064609 | A1 | 3/2007 | Igarashi |
| 2007/0177521 | A1 | 8/2007 | Fukuyama et al. |
| 2008/0215749 | A1* | 9/2008 | Bala et al. ...................... 709/233 |
| 2010/0106770 | A1* | 4/2010 | Taylor et al. ................... 709/203 |
| 2010/0202342 | A1* | 8/2010 | Yoshida et al. ............... 370/312 |
| 2012/0110205 | A1* | 5/2012 | Lee et al. ....................... 709/233 |

FOREIGN PATENT DOCUMENTS

| JP | 2005-184471 | 7/2005 |
| JP | 2007-74225 | 3/2007 |
| JP | 2007-208326 | 8/2007 |
| JP | 2009-118272 | 5/2009 |

OTHER PUBLICATIONS

Notification of Transmittal of Translation of the International Preliminary Report on Patentability and translation of Written Opinion of the International Searching Authority issued Aug. 22, 2013 in corresponding International Application No. PCT/JP2012/000837.
International Search Report issued May 1, 2012 in International (PCT) Application No. PCT/JP2012/000837.

* cited by examiner

Primary Examiner — Hitesh Patel
(74) Attorney, Agent, or Firm — Wenderoth, Lind & Ponack, L.L.P.

(57) ABSTRACT

A first communication device stores a transmission rate table including response times, and transmission rates associated with the response times, each first response time indicating a time for transmitting test data between the first and second communication devices, while transmitting load data between any pair of communication devices at one of different transmission rates. The first communication device determine a necessary transmission rate for actual data; detect a response time indicating a time for transmitting the test data between the first and second communication devices; determine a transmission rate associated with the response time, as a used transmission rate, based on the transmission rate table; determine an effective remaining transmission rate based on a maximum transmission rate of the communication network and the used transmission rate; and start transmission of the actual data when the effective remaining transmission rate is higher than the necessary transmission rate.

17 Claims, 12 Drawing Sheets

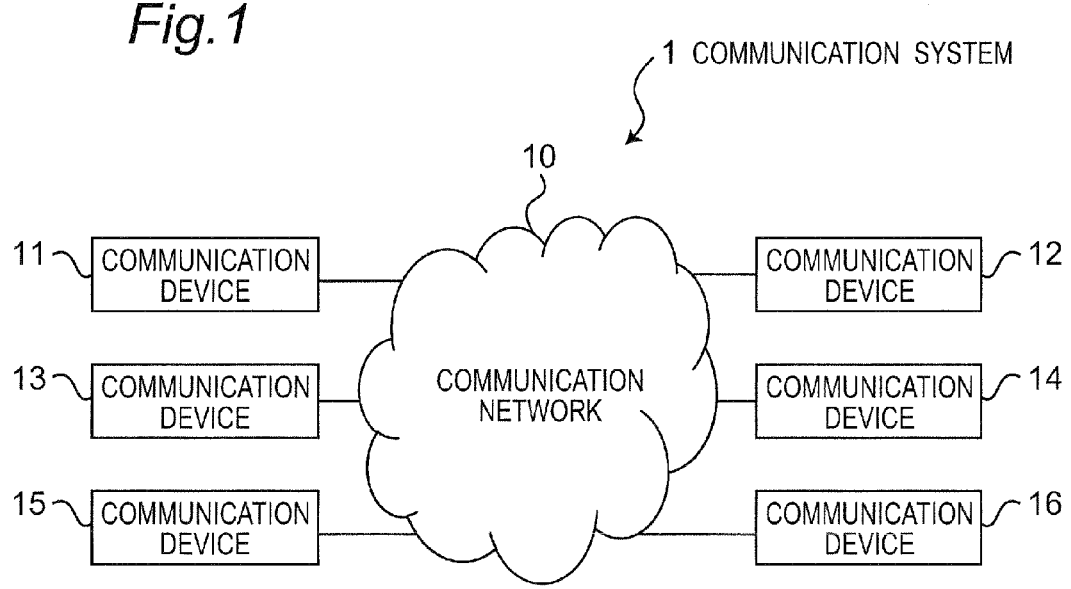
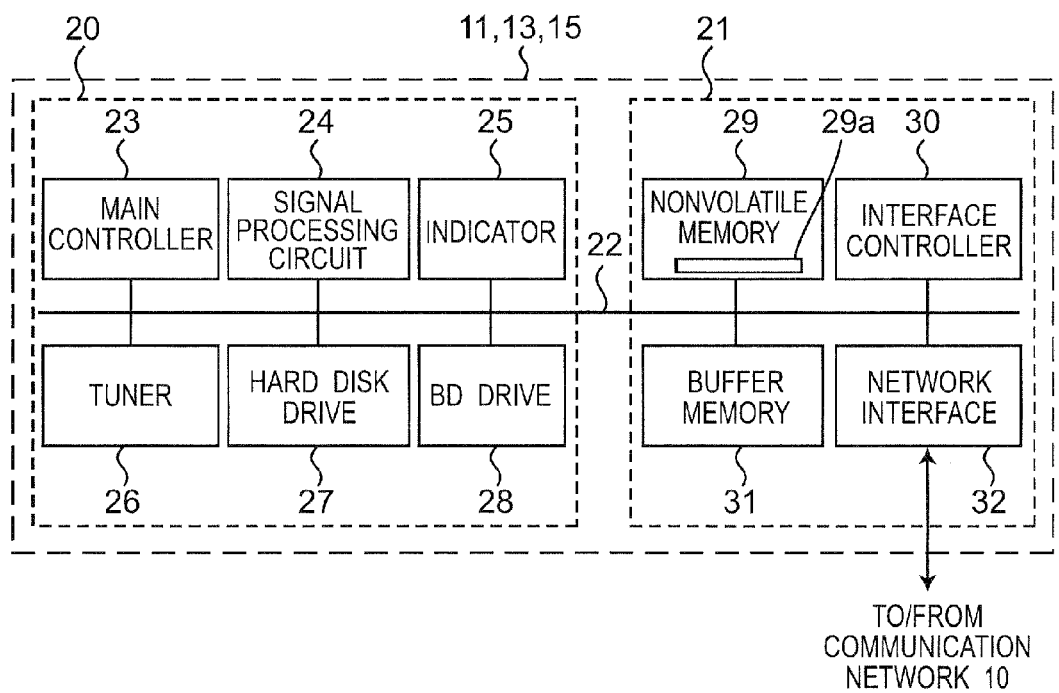

*Fig.13*

| n | TRANSMISSION RATE R(n) | RESPONSE TIME T(n) |
|---|---|---|
| 1 | 10 Mbps | 2 ms |
| 2 | 20 Mbps | 3 ms |
| 3 | 30 Mbps | 4 ms |
| 4 | 40 Mbps | 5 ms |
| 5 | 50 Mbps | 6 ms |
| 6 | 60 Mbps | 7 ms |

29a

MAXIMUM TRANSMISSION RATE Rmax

COMMUNICATION SYSTEM DETERMINING EFFECTIVE REMAINING TRANSMISSION RATE USING SMALL-SIZED TEST DATA BEFORE TRANSMITTING ACTUAL DATA

CROSS-REFERENCE TO RELATED APPLICATIONS

This is a continuation application of International Application No. PCT/JP2012/000837, as filed on an international filing date of Feb. 8, 2012, which claims priority of Japanese Patent Application No. 2011-026825 filed on Feb. 10, 2011, the content of which is incorporated herein by reference.

BACKGROUND

1. Technical Field

The technical field relates to a communication system and a communication method, and more specifically, relates to a communication system and a communication method for more reliable streaming in a communication system in a home network environment including a plurality of communication devices.

2. Description of Related Art

In recent years, FTTH (Fiber To The Home) has been popularized as means for connecting a personal computer at home to the Internet. At home, a home network has begun to be used, by which home appliances, computers, and other peripheral devices are interconnected for device-to-device communication. It is expected that in future, the home network is more and more popularized as a network for transmitting and receiving contents among devices connected over the network, and for providing convenient and comfortable user experiences.

For example, at home, it is possible to use, as a server device, an AV device having a video receiver unit such as a TV tuner and having a storage unit such as a hard disk, and to transmit a video content stored in the server device to a client device in another room through the home network. Thus, it is possible to stream and play back data; for example, the client device can receive a video content and simultaneously play back the video content.

A server device performing such streaming generates transmitting data through an encoding process, etc., and sends the transmitting data to the home network. On the other hand, a client device performing playback of streamed data temporarily stores received data in a buffer, and then, sequentially decodes and plays back the stored data.

However, a plurality of data communications may be in contention with each other over the home network. When such a plurality of data communications are in contention with each other, a shortage of a communication bandwidth occurs, thus causing problems such as a delay in streaming.

Various methods have been proposed for overcoming the contention of data communications. For example, Patent Document 1 discloses a configuration of a priority-based QoS (Quality of Service) technique for allocating a bandwidth to respective pieces of communication data according to priority. For example, in order to achieve real-time playback when streaming video data, it is necessary to transmit packets of the video data from a streaming server to a streaming client without delay. Meanwhile, some data packets allow a temporal delay. Therefore, a communication process is performed such that streaming data is set with a priority higher than that of normal communication data to differentiate between their priorities with which each data is processed.

When using the priorities, the contention of data communication is checked, for example, as follows. A certain length of check period is provided before starting delivery of new streaming data from a server device, and load data is transmitted with a priority lower than an original normal priority set for delivering the streaming data. The conditions for which the load data transmitted with the low priority being set are examined to determine whether or not to use the original normal priority for streaming transmission. If it is determined that the original normal priority can be used, then streaming data is transmitted with the original normal priority.

Even if another streaming transmission is simultaneously performed during the check period, it is possible to prevent that load data with a low priority affects existing streaming transmission with a high priority. That is, in the case in which the existing streaming is being performed, the load data never takes a bandwidth from the existing streaming, and accordingly, the load data does not distort a reproduced image at a client playing back the existing streaming.

CITATION LIST

Patent Literature

PATENT LITERATURE 1: Japanese Patent Laid-open Publication No. 2007-74225

SUMMARY

Technical Problem

However, in the case in which a large amount of load data with low priority is transmitted during the check period, the load data has as a high transmission rate as that of streaming data to be transmitted subsequently, and accordingly, the following problems occur. The first problem is that even if the load data has a low priority, the load data interferes data transmission with a priority equal to or less than that of the load data during the check period. If a high degree of the interference occurs, then the communication can not be performed during this period. The second problem is that since there is the large amount of load data with low priority, the check period may be apt to be extended due to repeated delays. Patent Document 1 discloses an exemplary length of check period, i.e., about one minute, however, a longer length of check period may be required. Hence, one minute or more of check period is required before starting transmission of streaming data, and thus, a user receiving the streaming data as a client has to wait during that period. The third problem is that each time performing streaming transmission, a large amount of load data needs to be transmitted in advance. Therefore, the first and second problems occur each time performing streaming transmission.

One non-limiting and exemplary embodiment is to provide a communication system and a communication method capable of reducing various problems occurring when using a large amount of load data.

Solution to Problem

According to one aspect of the present disclosure, there is provided a communication system that includes a plurality of communication devices including at least a first communication device and a second communication device, and connected to each other through a communication network. The first communication device is configured to store a transmission rate table in a storage device, the transmission rate table including first response times, and transmission rates associated with the first response times, each of the first response times indicating a length of time for transmitting test data, whose size is smaller than a size of load data, between the first and second communication devices, while transmitting the load data between any pair of communication devices among the plurality of communication devices at one of a plurality of different transmission rates. When transmitting actual data from the first communication device to the second communication device, the first communication device is configured to: determine a necessary transmission rate for transmitting the actual data; detect a second response time indicating a length of time for transmitting the test data between the first and second communication devices; determine a transmission rate associated with the second response time, as a used transmission rate, based on the transmission rate table; determine an effective remaining transmission rate of the communication network available to transmit the actual data, based on a maximum transmission rate of the communication network and the used transmission rate; and start transmission of the actual data when the effective remaining transmission rate is higher than the necessary transmission rate.

These general and specific aspects may be implemented using a system, a method, and a computer program, and any combination of systems, methods, and computer programs.

Advantageous Effects of Invention

According to the communication system and the communication method pertaining to the technique disclosed in this specification, for example, when the first communication device is installed in the communication system including the plurality of communication devices, the exclusive-use state by the first communication device, the second communication device, the third communication device, and the fourth communication device is started to check the traffic conditions of the communication network using a large amount of load data, and generate the transmission rate table (i.e., the correspondence between the transmission rates and the first response times). Thereafter, when a large amount of actual data is transmitted in a non-exclusive-use state, the first communication device detects the second response time using a small amount of test data before transmitting the actual data, and thus, determines whether or not it is possible to start stable transmission of actual data. Therefore, before transmitting the actual data, it is only necessary to transmit the small amount of test data for detecting the second response time. Thus, it is possible to minimize an amount of extra traffic to the communication network, as compared to the case in which the load data is transmitted. As a result, even in a non-exclusive-use state, test data does not interfere other communications, and the test period before transmitting the actual data can be significantly reduced to, for example, about 10 seconds or less. Even if such test data is transmitted every time before transmitting actual data, the transmission of test data does not impose any burden on a user who receives the actual data.

Further, by establishing the exclusive-use state by two communication devices, i.e., the first communication device and the second communication device, it is possible to simplify the transmission of various data among the plurality of communication devices, and thus, easily check the transmission rate table and the maximum transmission rate.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 1 is a block diagram showing a configuration of a communication system according to an embodiment of the present disclosure.

FIG. 2 is a block diagram showing a detailed configuration of communication devices 11, 13, and 15 of FIG. 1.

FIG. 13 is a table showing an example of transmission rates R(n) and response times T(n) which are stored in a transmission rate table 29a of the communication device 11 of FIG. 1.

DETAILED DESCRIPTION

Figure 3:
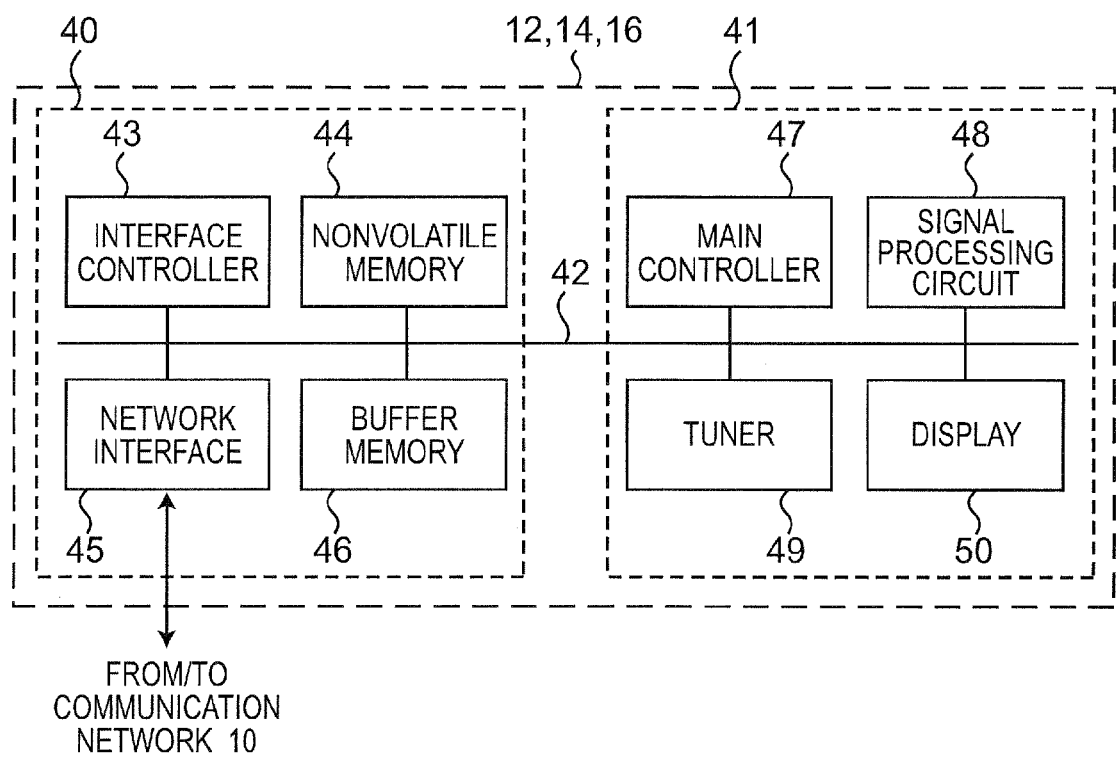
FIG. 3 is a block diagram showing a detailed configuration of communication devices 12, 14, and 16 of FIG. 1.

Some exemplary embodiments will be described below with reference to the drawings. In the drawings, those components representing substantially the same configurations, operation, and effects are denoted by the same reference signs.

(1) Communication System 1 and Communication Network 10

FIG. 1 is a block diagram showing a configuration of a communication system according to an embodiment of the present disclosure. A communication system 1 includes a communication device 11, a communication device 12, a communication device 13, a communication device 14, a communication device 15, a communication device 16, and a communication network 10. The communication devices 11 to 16 can communicate with each other over the communication network 10. In one example, the communication devices 11 to 16 are home digital AV devices having a communication function, and the communication network 10 is a home network. In another example, the communication system 1 may be a network system in a shopping mall, a premise, a broadcast studio, or the like. The communication network 10 may be a wireless network or a wired network.

A communication bandwidth of the communication network 10 can be shared among the communication devices 11 to 16. The communication bandwidth refers to a maximum transmission rate available in the communication network 10 for transmission, and is called the "maximum transmission rate" in this specification. The communication devices 11 to 16 can share the communication network 10 at a desired ratio, such that a sum of the transmission rates of pieces of data transmitted simultaneously is less than or equal to the maximum transmission rate.

As examples of the communication network 10, there are the wireless network, such as a wireless LAN (Local Area Network), e.g., a wireless LAN defined by IEEE 802.11n (IEEE: Institute of Electrical and Electronic Engineers); and the wired network, such as Ethernet (registered trademark) including connections through repeater hubs. In the case of a wireless LAN of the IEEE 802.11n, although the maximum communication bandwidth of 300 Mbits/second is currently available in Japan, the effective net maximum transmission rate without redundant portions for various headers, etc, is somewhat lower than the maximum communication bandwidth.

In the shared communication network 10, multiple accesses over the shared network are controlled using multiple access control schemes, such as CSMA/CA (Carrier Sense Multiple Access with Collision Avoidance) for the wireless LAN, and CSMA/CD (Carrier Sense Multiple Access with Collision Detection) for the Ethernet. In this case, as the transmission rate approaches the maximum transmission rate as a result of an increased traffic in the communication network 10, the frequency of collision avoidances or collision detections increases, and thus, transmission delay increases.

In addition to the communication devices 11 to 16, there may be other communication devices to be connected to the communication network 10. In this specification, considering such a communication system 1, an "exclusive-use state" refers to a state in which only specific communication devices exclusively use the communication network 10 and only these communication devices can communicate with each other, and a "non-exclusive-use state" refers to a state in which any communication devices non-exclusively use the communication network 10 and can communicate with each other. For example, when four communication devices 11 to 14 are in the exclusive-use state, each of the communication devices 15 and 16 can not communicate with any of the communication devices in the communication system 1. In this case, for example, the communication devices 15 and 16 are powered off. For example, when four communication devices 11 to 14 are in the non-exclusive-use state, each of the communication devices 15 and 16 can communicate with other five communication devices, excluding itself.

(2) Communication Devices 11 to 16

Each of the communication devices 11, 13, and 15 is, for example, a Hard Disk Drive (HDD) recorder, and capable of playing back actual data, e.g., a video content stored in a hard disk or Blu-ray disc, and transmitting the actual data to the communication network 10. Each of the communication devices 12, 14, and 16 is, for example, a digital television broadcast receiver, and capable of displaying actual data received through the communication network 10. That is, each of the communication devices 11, 13, and 15 is operable as a server, and each of the communication devices 12, 14, and 16 is operable as a client.

FIG. 2 is a block diagram showing a detailed configuration of the communication devices 11, 13, and 15 of FIG. 1. The communication device 11 includes a main body unit 20, an interface unit 21, and a wiring 22. The main body unit 20 includes a main body portion of the HDD recorder, and the interface unit 21 includes an interface portion of the HDD recorder. The wiring 22 may be configured as any of a bus, a switch, a one-to-one direct wiring, or a combination thereof. The main body unit 20 includes a main controller 23, a signal processing circuit 24, an indicator 25, a tuner 26 for digital television broadcasts, a hard disk drive 27, and a Blu-ray Disc (BD) drive 28. The signal processing circuit 24 includes a decoder and an encoder. The indicator 25 is, for example, a relatively small indicator provided at a front of the HDD recorder, and displaying various information for operation. A drive for other media, such as a DVD (Digital Versatile Disc) disc drive, may be provided instead of the Blu-ray Disc drive 28. The interface unit 21 includes a nonvolatile memory 29, an interface controller 30, a buffer memory 31, and a network interface 32. Each of the communication devices 11, 13, and 15 does not need to include all of the tuner 26, the hard disk drive 27, and the Blu-ray Disc drive 28, and for example, may include any one of them.

FIG. 3 is a block diagram showing a detailed configuration of the communication devices 12, 14, and 16 of FIG. 1. The communication device 12 includes an interface unit 40, a main body unit 41, and a wiring 42. The interface unit 40 includes an interface portion of the digital television broadcast receiver, and the main body unit 41 includes a main body portion of the digital television broadcast receiver. The wiring 42 is configured in a manner similar to that of the wiring 22. The interface unit 40 includes an interface controller 43, a nonvolatile memory 44, a network interface 45, and a buffer memory 46. The main body unit 41 includes a main controller 47, a signal processing circuit 48, a tuner 49 for digital television broadcasts, and a display 50. The signal processing circuit 48 includes a TS (Transport Stream) decoder (not shown) and an MPEG-2 (Moving Picture Experts Group-2) decoder (not shown).

Each of the interface controllers 30 and 43 performs various data processing according to flowcharts of FIGS. 4 to 10, which will be described later. Each of the interface controllers 30 and 43 may be configured as a microprocessor or microcomputer with a program written based on the flowcharts of FIGS. 4 to 10. Each of the interface controllers 30 and 43 may be configured as a wired logic circuit, such as an FPGA (Field Programmable Gate Array) that generates a timing signal based on the flowcharts of FIGS. 4 to 10. Further, each of the interface controllers 30 and 43 may be configured as a hybrid circuit of a microprocessor or microcomputer and a wired logic circuit. The interface controllers 30 and 43 may be integrated with the main controllers 23 and 47 of the main body units 20 and 41, respectively.

Each of the nonvolatile memories 29 and 44 is configured as an EPROM (Erasable Programmable Read-Only Memory) or the like, and stores a transmission rate table 29a, which will be described later (see FIG. 13). Each of the buffer memories 31 and 46 is configured as a volatile memory such as a RAM (Random Access Memory), and temporarily stores data. Each of the network interfaces 32 and 45 is configured as a wired logic circuit, a microprocessor or microcomputer, or a hybrid circuit thereof, and performs various data processing of the data link layer and various signal processing of the physical layer.

The hard disk drive 27 stores, for example, MPEG-2 TS data. The hard disk drive 27 may store MPEG-2 TS data obtained from the signal processing circuit 24, as an AV content of a digital television broadcast received by the tuner 26. Further, the Blu-ray Disc drive 28 reads MPEG-2 TS data from a Blu-ray disc, in which the MPEG-2 TS data is stored as an AV content.

Figure 11:
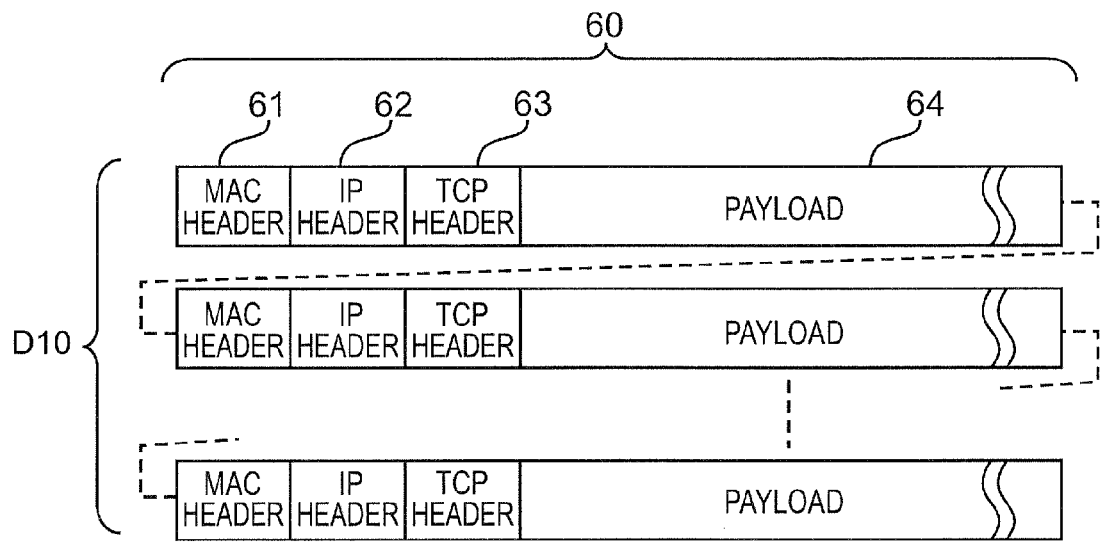
FIG. 11 is a diagram showing a data structure D10 of actual data and load data to be transmitted and received by the communication system 1 of FIG. 1.

FIG. 11 is a diagram showing a data structure D10 of actual data and load data to be transmitted and received by the communication system 1 of FIG. 1. In this specification, "actual data" refers to data including an AV content transmitted from a transmitting communication device to a receiving communication device in response to a request from the receiving communication device, and "load data" refers to data for measuring a transmission rate, etc., in the communication network 10 (data which is not an AV content). The data structure D10 includes a plurality of MAC (Media Access Control) frames 60. One MAC frame 60 includes a MAC header 61, an IP (Internet Protocol) header 62, a TCP (Transmission Control Protocol) header 63, and a payload 64 in time-sequence order. MPEG-2 TS data is converted to the format of the data structure D10. In this case, the payload 64 consists of, for example, seven 188-byte TS packets and data about an HTTP (HyperText Transfer Protocol) protocol, such that the size of the MAC frame 60 is less than or equal to normal 1518 bytes. The payload 64 is encapsulated by the TCP protocol, and is further encapsulated in an IP packet, and is further encapsulated in a MAC frame.

Referring to FIG. 2, the interface controller 30 reads MPEG-2 TS data from any of the tuner 26, the hard disk drive 27, and the Blu-ray Disc drive 28, and encapsulates the MPEG-2 TS data, generates a TCP packet, and then generates an IP packet, while temporarily storing in the buffer memory 31. According to an instruction from the interface controller 30, the network interface 32 encapsulates the IP packet in a MAC frame, and performs physical layer signal processing, such as radio band modulation for the wireless network or baseband encoding for the wired network, thus generating actual data. The network interface 32 transmits the actual data to the communication network 10, at timing based on media access control, such as CSMA/CA for the wireless network or CSMA/CD for the wired network. Thus, the communication device 11 generates the actual data by converting MPEG-2 TS data to the format of the data structure D10.

Referring to FIG. 3, the network interface 45 receives the actual data, and according to an instruction from the interface controller 43, and performs physical layer signal processing, such as demodulation from the radio band for the wireless network or baseband decoding for the wired network, thus generating a MAC frame. The network interface 45 decapsulates the MAC frame, thus generating an IP packet. The interface controller 43 decapsulates the IP packet, generates a TCP packet, and then generates MPEG-2 TS data, while temporarily storing in the buffer memory 46. The main body unit 41 performs TS decoding and MPEG-2 decoding on the MPEG-2 TS data using the TS decoder and the MPEG-2 decoder in the signal processing circuit 48, respectively, and displays the decoded data on the display 50.

In the above-described example, the communication devices 11 to 16 use the HTTP and TCP protocols. Such a combination of these protocols is particularly effective in a wireless network where the transmission error rate is relatively high. On the other hand, in a wired network where the transmission error rate is relatively low, a combination of RTP (Real-time Transport Protocol) and UDP (User Datagram Protocol) protocols mainly for achieving real-time transmission with a short delay may be used, instead of the HTTP and TCP protocols. In this case, the size of the buffer memory 46 can be reduced. Further, although in the above-described example the network interfaces 32 and 45 encapsulate and decapsulate MAC frames, respectively, the interface controllers 30 and 43 may encapsulate and decapsulate MAC frames, respectively. On the other hand, although in the above-described example the interface controllers 30 and 43 process the HTTP and TCP protocols or the RTP and UDP protocols, the network interfaces 32 and 45 may process these protocols. Further, although in the above-described example the communication devices 11 to 16 use TS over IP where a TS packet is encapsulated in an IP packet, the communication devices 11 to 16 may use IP over TS where an IP packet is split into smaller portions and each portion is encapsulated in a TS packet.

Next, with reference to FIGS. 4 to 10, data transmission performed in the communication system 1 of the present embodiment will be described.

(3) Transmission Rate Table Generation Process

Figure 4:
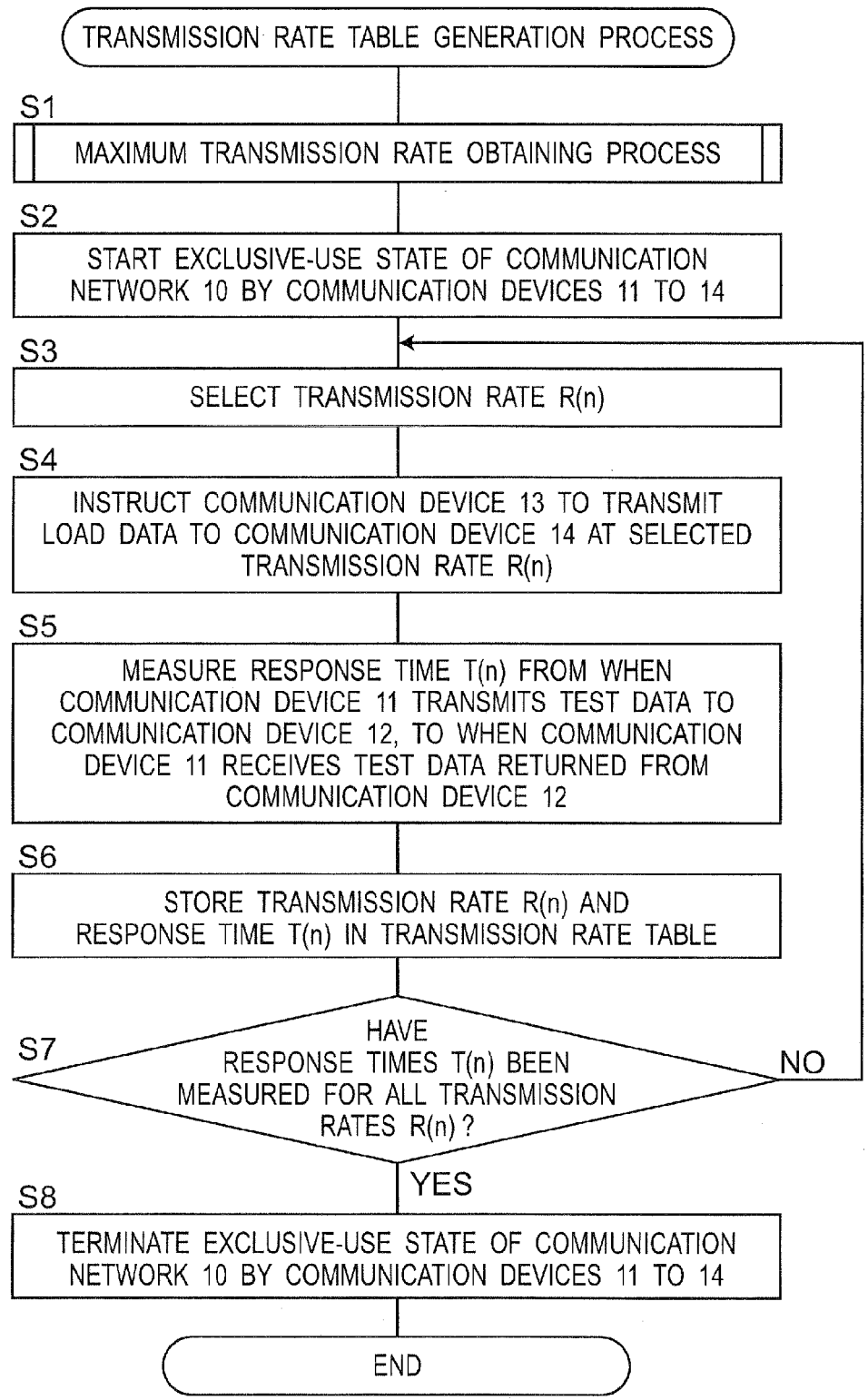
FIG. 4 is a flowchart showing a transmission rate table generation process performed by the communication device 11 of FIG. 1.

FIG. 4 is a flowchart showing a transmission rate table generation process performed by the communication device 11 of FIG. 1. According to the communication system 1 of the present embodiment, prior to transmitting data from the transmitting communication device 11 to the receiving communication device 12 in response to a request from the receiving communication device 12 (transmission of actual data), the communication system 1 initially generates a "transmission rate table 29a". The transmission rate table 29a stores response times, and transmission rates associated with the response times; each response times indicates a length of time for transmitting "test data", whose size is smaller than that of load data, between the communication device 11 and the communication device 12, while transmitting the load data between any pair of communication devices among the communication devices 11 to 16 at one of a plurality of different transmission rates. The transmission rate table 29a is stored in the nonvolatile memory 29 of the communication device 11. Since the communication system 1 of the present embodiment uses the transmission rate table 29a generated in advance, it is possible to reduce various problems caused by using a large amount of load data as disclosed in the prior art.

FIG. 13 is a table showing an example of transmission rates R(n) and response times T(n) which are stored in the transmission rate table 29a of the communication device 11 of FIG. 1. The transmission rates R(n) and the response times T(n) in the transmission rate table 29a are initially blank. In this case, each transmission rate R(n) corresponds, for example, to the transmission rate of a payload 64 in actual data to be transmitted over the communication network 10. Note that since any reference rate can be selected, the transmission rate R(n) may be, for example, the transmission rate of a payload of an IP packet (i.e., a TCP header 63 and a payload 64). In the following explanation, the transmission rate R(n) is the transmission rate of a payload 64.

The interface controller 30 of the communication device 11 performs a transmission rate table generation process of FIG. 4, for example, when the transmission rate table 29a is blank (e.g., when the communication device 11 is connected to the communication network 10 for the first time and is powered on for the first time).

In step S1 of FIG. 4, the interface controller 30 of the communication device 11 performs a maximum transmission rate obtaining process to obtain a maximum transmission rate Rmax of the communication network 10. The maximum transmission rate Rmax may be a known value which is inputted by the user, or may be obtained by any of the methods which will be described below with reference to FIGS. 5 to 7.

In step S2, the interface controller 30 of the communication device 11 starts an exclusive-use state of the communication network 10 by the communication devices 11 to 14. The exclusive-use state corresponds, for example, to a state occurring when the communication device 11 is installed and connections between the communication device 11 and the other communication devices 12 to 16 in the communication network 10 are checked. The interface controller 30 of the communication device 11 instructs the communication devices 12 to 14 to perform necessary operations for the process of FIG. 4, and instructs the other communication devices 15 and 16 to be on standby without transmitting any data.

Instead of starting the exclusive-use state by instructions from the communication device 11, the user may start the exclusive-use state by powering on only the communication devices 11 to 14 and powering off the other communication devices 15 and 16.

In step S3, the interface controller 30 of the communication device 11 selects any transmission rate R(n) less than or equal to the maximum transmission rate Rmax. In this case, the interface controller 30 of the communication device 11 selects, for example, any one of the transmission rates R(n) of FIG. 13. In the example of FIG. 13, the transmission rate table 29a has six transmission rates from the transmission rate R(1)=10 Mbps (M bits/second), to the transmission rate R(6)= 60 Mbps equal to the maximum transmission rate Rmax of the communication network 10, in steps of 10 Mbps, for parameter n=1 to 6. In the following explanation, the case of n=1 in FIG. 13, i.e., the transmission rate R(1)=10 Mbps, is initially selected.

In step S4, the interface controller 30 of the communication device 11 instructs the communication device 13 to transmit load data to the communication device 14 at the selected transmission rate R(n). The transmission of the load data continues for a certain test period (e.g., 10 seconds). The load data has a format similar to that of the data structure D10 of actual data based on MPEG-2 TS data. However, the payload 64 of the load data is not MPEG-2 TS data as is in the case of actual data, but is random data which can be calculated using a mathematical function, or constant data where each byte is "FF", etc. in hexadecimal. The interface controller 30 can generate fixed data such as random data or constant data, irrespective of the main body unit 20.

The size of a MAC header 61 is 18 bytes. Specifically, although the header is 14 bytes and the trailer is 4 bytes, they are collectively represented as the header in FIG. 11 for ease of explanation. The size of an IP header 62 is normally 20 bytes for IPv4 (Internet Protocol version 4). The size of a TCP header 63 is normally 20 bytes. In order for the size of the MAC frame 60 to be less than or equal to normal 1518 bytes, the maximum size of a payload 64 is 1460 bytes. The interface controller 30 generates an IP packet containing the payload 64 such that the transmission rate of the payload 64 is, for example, 10 Mbps, in a manner similar to the above-described method for generating the actual data, and sends the IP packet to the network interface 32. The network interface 32 can generate load data having a transmission rate of 10 Mbps, from the inputted 10-Mbps IP packet, in a manner similar to the above-described method for generating the actual data. When the transmission device 13 transmits load data having a transmission rate of 10 Mbps to the communication device 14 during a test period of, for example, 10 seconds, the total size of payloads 64 is: 10/8×10 seconds=about 12 M bytes.

Figure 12:
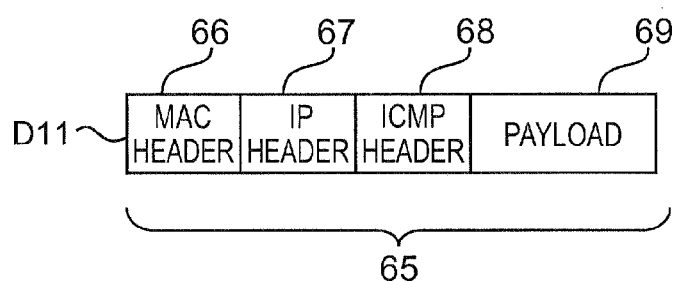
FIG. 12 is a diagram showing a data structure D11 of test data to be transmitted and received by the communication system 1 of FIG. 1.

In step S5, while the communication device 13 transmits the load data to the communication device 14 (step S4), the interface controller 30 of the communication device 11 measures a response time T(n) from when the communication device 11 transmits test data to the communication device 12, to when the communication device 11 receives test data returned from the communication device 12. FIG. 12 is a diagram showing a data structure D11 of test data to be transmitted and received by the communication system 1 of FIG. 1. The data structure D11 includes one MAC frame 65, and the MAC frame 65 includes a MAC header 66, an IP header 67, an ICMP (Internet Control Message Protocol) header 68, and a payload 69 in time-sequence order. The MAC header 66 and the IP header 67 are the same as the MAC header 61 and IP header 62 of the data structure D10. The ICMP header 68 includes type, identifier, and sequence number.

The type of the ICMP header 68 represents various functions that can be performed using the ICMP header 68. Test data uses two of the functions of the ICMP header 68, i.e., an Echo Message and an Echo Reply Message. When a plurality of pieces of test data are transmitted between the communication devices 11 and 12, the individual pieces of test data can be distinguished by the identifiers of ICMP headers 68, and can be ordered in a time sequence by the sequence numbers of the ICMP headers 68. The payload 69 contains a time code obtained at the moment of transmission.

As described above, the size of the MAC header 66 is 18 bytes, and the size of the IP header 67 is 20 bytes. The size of the ICMP header 68 is 8 bytes for each of the Echo Message and the Echo Reply Message. When the time code is represented by, for example, 4 bytes, the payload 69 is 4 bytes. The size of the test data is a sum of these sizes, and thus: 18+20+8+4=50 bytes. Since the normal minimum size of a MAC frame is 64 bytes, the size of the test data is set to 64 bytes, using 18 bytes of the payload 69.

The interface controller 30 generates a payload 69 containing the current time, i.e., a time code obtained at the moment of transmission, and then adds an ICMP header 68 with an Echo Message being set. The interface unit 21 encapsulates data consisting of the payload 69 and the ICMP header 68 in an IP packet, and then encapsulates the IP packet in a MAC frame, in a manner similar to the above-described method for generating load data, thus generating test data. The communication device 11 sends the test data to the communication device 12.

The interface unit 40 of the communication device 12 decapsulates the test data. The interface controller 43 extracts the ICMP header 68, and changes the type of the ICMP header 68 from the Echo message to the Echo Reply Message. The interface unit 40 encapsulates data consisting of the payload 69 and the changed ICMP header 68 in an IP packet, and then encapsulates the IP packet in a MAC frame, thus generating test data. The communication device 12 sends the test data to the communication device 11. The interface unit 21 decapsulates the test data and extracts the payload 69. The interface controller 30 can determine a response time indicating a round-trip time of the test data between the communication devices 11 and 12, based on the difference between the time code in the payload 69 and a current time, i.e., a time code obtained at the moment of reception.

The communication device 11 may transmit test data a plurality of times between the communication device 11 and the communication device 12 during a certain test period (e.g., 10 seconds). The interface controller 30 may set an average of a plurality of transmission times as a response time T(n). Thus, although the response time T(n) is apt to change depending on the traffic conditions of the communication network 10, it is possible to improve the reliability of the response time T(n). Each response time T(n) shown in FIG. 13 is an example of an averaged value. Alternatively, the interface controller 30 may set the maximum of a plurality of transmission times as a response time T(n). Thus, it is possible to take into account the case of the worst response time occurring depending on the traffic conditions of the communication network 10. The interface controller 30 may have a table including the identifiers and sequence numbers of ICMP headers 68, time codes obtained at the moment of transmission, and time codes obtained at the moment of reception, for the plurality of transmissions as described above. Thus, a payload 69 does not need to contain a time code obtained at the moment of transmission.

The traffic conditions of the communication network 10 depend on the amount of data traveling over the communication network 10 (i.e., the amount of traffic) during the test period. In other words, the traffic conditions depend on the total transmission rate of all data traveling over the communication network 10. When the transmission rate R(n) is 10 Mbps and the test period is 10 seconds, the amount of load data is 12 M bytes as described above. Assuming five round trips between the communication device 11 and the communication device 12 during the test period, the size of the test data is: 64 bytes×2×5=640 bytes, and the transmission rate is: 640 bytes×8/10 seconds=512 bps. That is, the load data provides a traffic of 10 Mbps and 12 M bytes to the communication network 10, and the test data provides a traffic of 512 bps and 640 bytes to the communication network 10. Therefore, the test data only provides as a low traffic as about 1/20000 of that of the load data, to the communication network 10. Accordingly, the influence of the test data to the amount of traffic is negligible.

A TOS (Type Of Service) field of 1 byte size defined in the IP headers 62 and 67 of IPv4 may be used for transmission control in the traffic conditions of the communication network 10. By using the TOS field, it is possible to select a priority level of data to be transmitted over the communication network 10. In the exclusive-use state by four communication devices 11 to 14, the priority level of test data is set to be equal to that of load data. As described above, even if the test data and the load data have the same priority level, the influence of the test data to the amount of traffic is negligible.

Thus, in step S5 of FIG. 4, while the communication device 13 transmits load data to the communication device 14 with any transmission rate R(n) less than or equal to the maximum transmission rate Rmax, the communication device 11 transmits and receives the test data, whose size is smaller than that of load data, to/from the communication device 12, and detects a response time T(n) with respect to the communication device 12. As a result, for n=1 in FIG. 13, the response time T(1)=2 ms is obtained for the transmission rate R(1)=10 Mbps, and thus, one data pair including the transmission rate R(n) and the response time T(n) is obtained.

In step S6, the interface controller 30 of the communication device 11 stores the obtained pair of the transmission rate R(n) and the response time T(n) in the transmission rate table 29a.

In step S7, the interface controller 30 of the communication device 11 determines whether or not response times T(n) have been measured for all the transmission rates R(n); if YES, then the process proceeds to step S8; and if NO, then the process returns to step S3. In this disclosure, in order to further test for, for example, n=2 to 6 in FIG. 13, steps S3 to S6 are repeated five times. Thus, the whole transmission rate table 29a of FIG. 13 is obtained.

As described above, the traffic conditions of the communication network 10 depend on the total transmission rate of all data traveling over the communication network 10. As the transmission rate R(n) of load data increases, the amount of traffic in the communication network 10 monotonously increases. Hence, in a shared network, the collision avoidance (in the case of a wireless LAN) or the collision detection (in the case of Ethernet) as described above occur more frequently, thus delaying a moment of transmitting test data between the communication devices 11 and 12. Therefore, as shown in FIG. 13, as the transmission rate R(n) increases from 10 Mbps to 60 Mbps, the response time T(n) increases from 2 ms to 7 ms.

In step S8, the interface controller 30 of the communication device 11 terminates the exclusive-use state of the communication network 10 by the communication devices 11 to 14. In step S8, for example, the communication device 11 notifies the communication devices 12 to 16 of the termination of the exclusive-use state, releasing the communication network 10 having been exclusively used by the communication devices 11 to 14.

As described above, by performing a transmission rate table generation process of FIG. 4, the transmission rate table 29a of FIG. 13 can be generated. The generated transmission rate table 29a is stored in the nonvolatile memory 29.

According to the embodiment configured in the above-described manner, the communication device 11 selects a transmission rate R(n) (step S3), and instructs the communication device 13 to transmit the load data at the selected transmission rate R(n) (step S4). Alternatively, the communication device 13 may select a transmission rate R(n). In this case, the communication device 13 selects a transmission rate R(n) less than or equal to the maximum transmission rate Rmax, transmits the load data from the communication device 13 to the communication device 14 at the selected transmission rate R(n), and notifies the communication device 11 of the selected transmission rate R(n). The interface controller 30 of the communication device 11 stores a data pair including the notified transmission rate R(n) and a measured response time T(n) in the transmission rate table 29a.

(4) Measurement of the Maximum Transmission Rate Rmax

The maximum transmission rate Rmax may be a known value which is inputted by the user as described above, or may be obtained by the communication devices 11 to 14 through measurement.

The maximum transmission rate Rmax of the communication network 10 can be deter mined by transmitting load data between any pair of communication devices (e.g., the communication devices 11 and 12) among the communication devices 11 to 16, gradually increasing the transmission rate of the load data, and detecting congestion of the communication network 10 using the following measurement methods. According to the first measurement method, particularly when using the TCP protocol, the interface controller 30 of the communication device 11 checks used space and unused space of a buffer memory (not shown) in the network interface 32, and if the buffer memory is full, then the interface controller 30 determines that the transmission rate exceeds the maximum transmission rate Rmax. According to the second measurement method, particularly when using the UDP protocol, the interface controller 43 of the communication device 12 calculates an error rate of load data received from the communication device 11, and sends information of the error rate back to the communication device 11. If the error rate is greater than or equal to a certain upper limit, then the interface controller 30 of the communication device 11 determines that the transmission rate exceeds the maximum transmission rate Rmax. The upper limit is, for example, an upper limit of an error rate at which errors can be corrected using a Reed-Solomon code of a TS packet. In addition, an error rate of load data can be calculated because the load data is fixed data as described above. In the second measurement method, the communication device 12 may just send the load data received from the communication device 11, back to the communication device 11, and the interface controller 30 of the communication device 11 may calculate an error rate of the load data. This is the third measurement method. Note that the above-described buffer memory (not shown) in the network interface 32 may be integrated with the buffer memory 31.

Next, with reference to FIGS. 5 to 7, examples of measurement of the maximum transmission rate Rmax based on an arbitrary one of the above-described measurement methods will be described.

Figure 5:
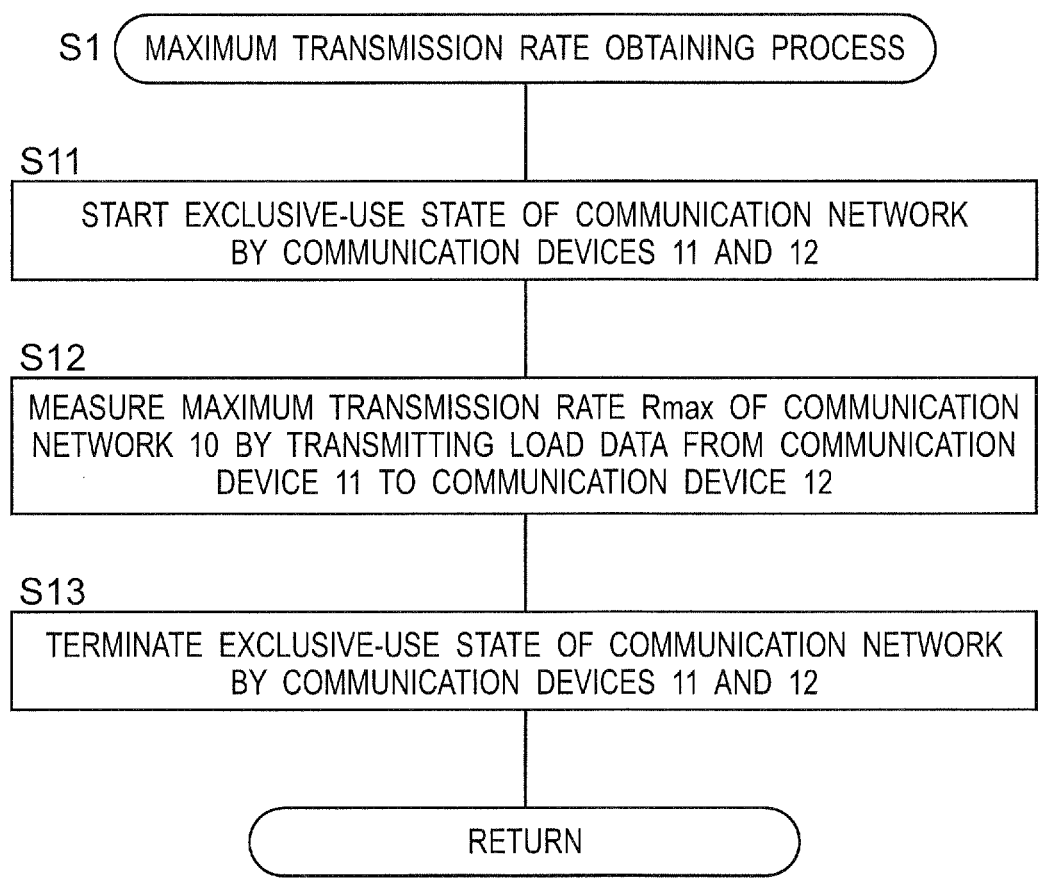
FIG. 5 is a subroutine showing a first implementation example of step S1 of FIG. 4.

FIG. 5 is a subroutine showing a first implementation example of step S1 of FIG. 4. In the process of FIG. 5, the communication devices 11 and 12 measure the maximum transmission rate Rmax. In step S11 of FIG. 5, the interface controller 30 of the communication device 11 starts an exclusive-use state of the communication network by the communication devices 11 and 12. The interface controller 30 of the communication device 11 instructs the communication device 12 to perform necessary operations for the process of FIG. 5, and instructs the other communication devices 13 to 16 to be on standby without transmitting any data. In step S12, the interface controller 30 of the communication device 11 measures the maximum transmission rate Rmax of the communication network 10 by transmitting load data from the communication device 11 to the communication device 12. The interface controller 30 of the communication device 11 stores the measured maximum transmission rate Rmax in the nonvolatile memory 29. In step S13, the interface controller 30 of the communication device 11 terminates the exclusive-use state of the communication network by the communication devices 11 and 12. In step S13, for example, the communication device 11 notifies the communication devices 12 to 16 of the termination of the exclusive-use state, releasing the communication network 10 having been exclusively used by the communication devices 11 and 12. Thereafter, the process proceeds to step S2 of FIG. 4.

Figure 6:
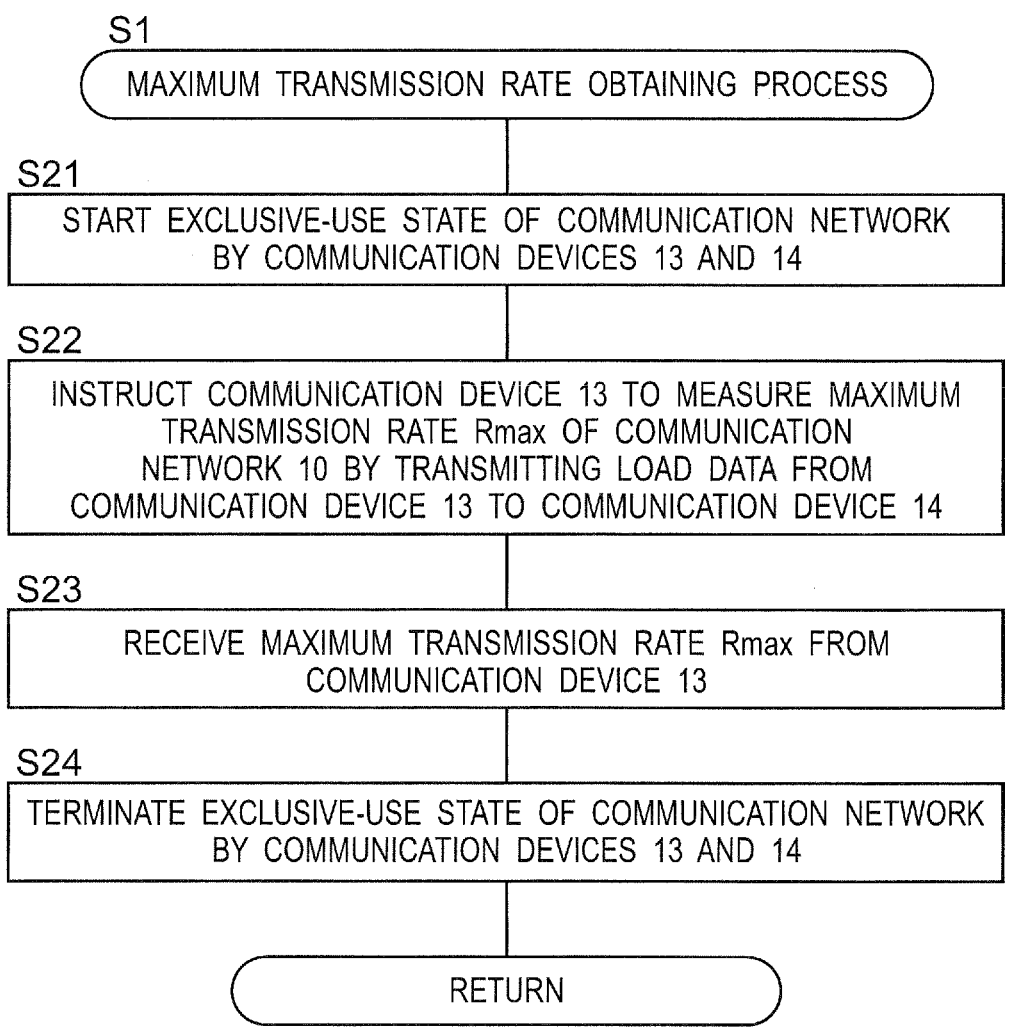
FIG. 6 is a subroutine showing a second implementation example of step S1 of FIG. 4.

FIG. 6 is a subroutine showing a second implementation example of step S1 of FIG. 4. In the process of FIG. 6, the communication devices 13 and 14 measure the maximum transmission rate Rmax. In step S21 of FIG. 6, the interface controller 30 of the communication device 11 starts an exclusive-use state of the communication network by the communication devices 13 and 14. The interface controller 30 of the communication device 11 instructs the communication devices 13 and 14 to perform necessary operations for the process of FIG. 6, and instructs the other communication devices 12, 15, and 16 to be on standby without transmitting any data. In step S22, the interface controller 30 of the communication device 11 instructs the interface controller 30 of the communication device 13 to measure the maximum transmission rate Rmax of the communication network 10 by transmitting load data from the communication device 13 to the communication device 14. The interface controller 30 of the communication device 13 stores the measured maximum transmission rate Rmax in the nonvolatile memory 29. In step S23, the interface controller 30 of the communication device 11 receives the maximum transmission rate Rmax from the communication device 13. The interface controller 30 of the communication device 11 stores the received maximum transmission rate Rmax in the nonvolatile memory 29. In step S24, the interface controller 30 of the communication device 11 terminates the exclusive-use state of the communication network by the communication devices 13 and 14. In step S24, for example, the communication device 11 notifies the communication devices 12 to 16 of the termination of the exclusive-use state, releasing the communication network 10 having been exclusively used by the communication devices 13 and 14. Thereafter, the process proceeds to step S2 of FIG. 4.

Figure 7:
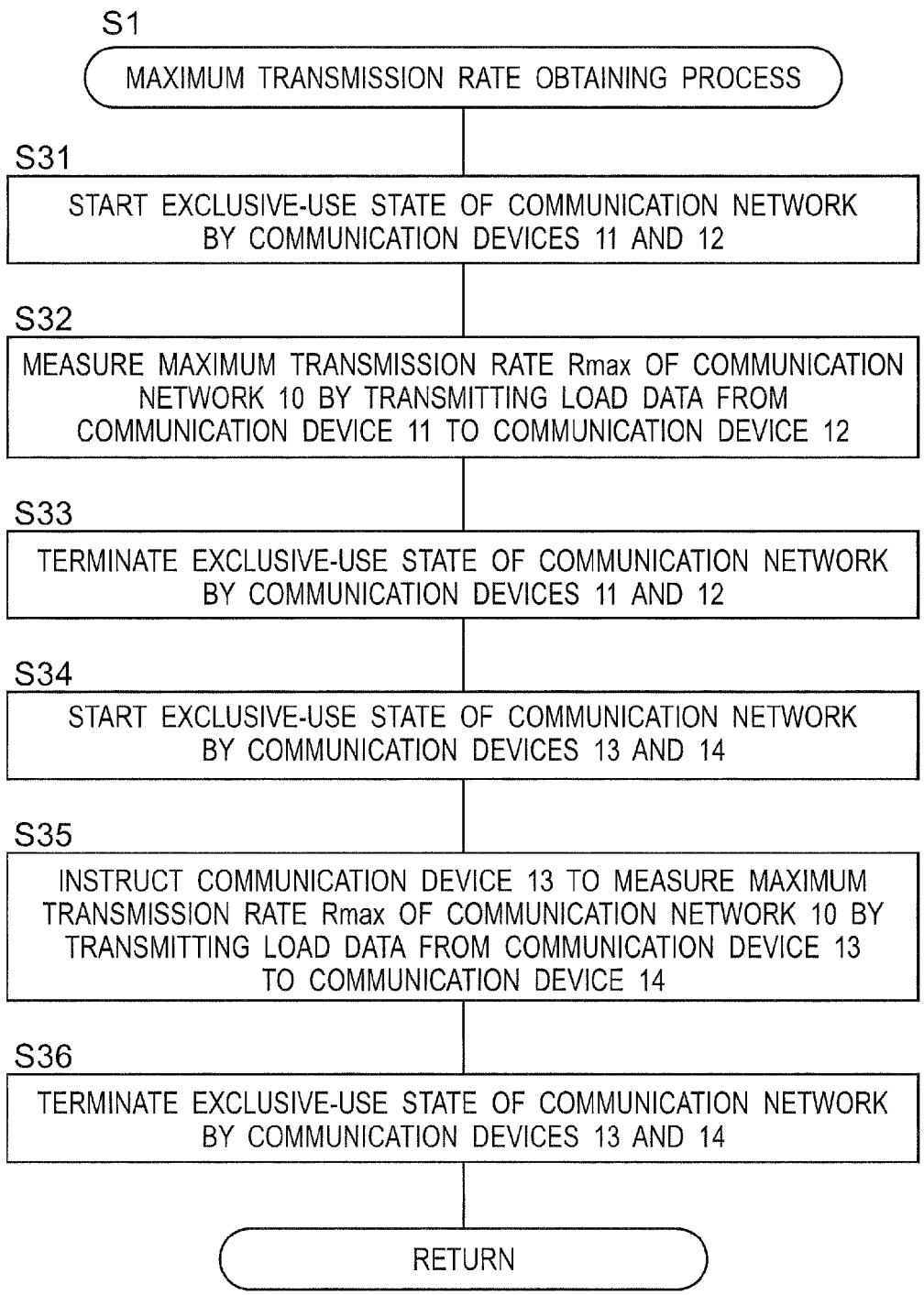
FIG. 7 is a subroutine showing a third implementation example of step S1 of FIG. 4.

FIG. 7 is a subroutine showing a third implementation example of step S1 of FIG. 4. In the process of FIG. 7, the communication devices 11 and 12 measure the maximum transmission rate Rmax, and further, the communication devices 13 and 14 measure the maximum transmission rate Rmax. In step S31 of FIG. 7, the interface controller 30 of the communication device 11 starts an exclusive-use state of the communication network by the communication devices 11 and 12. In step S32, the interface controller 30 of the communication device 11 measures the maximum transmission rate Rmax of the communication network 10 by transmitting load data from the communication device 11 to the communication device 12. The interface controller 30 of the communication device 11 stores the measured maximum transmission rate Rmax in the nonvolatile memory 29. In step S33, the interface controller 30 of the communication device 11 terminates the exclusive-use state of the communication network by the communication devices 11 and 12. In step S34, the interface controller 30 of the communication device 11 starts an exclusive-use state of the communication network by the communication devices 13 and 14. In step S35, the interface controller 30 of the communication device 11 instructs the communication device 13 to measure the maximum transmission rate Rmax of the communication network 10 by transmitting load data from the communication device 13 to the communication device 14. The communication device 13 stores the measured maximum transmission rate Rmax in the nonvolatile memory 29. In step S36, the interface controller 30 of the communication device 11 terminates the exclusive-use state of the communication network by the communication devices 13 and 14. Thereafter, the process proceeds to step S2 of FIG. 4.

According to the process of FIG. 7, it is possible to measure an appropriate maximum transmission rate, for example, when the maximum transmission rate varies per each combination of communication devices (between the communication devices 11 and 12, and between the communication devices 13 and 14) in a wireless environment. In addition, by using the exclusive-use state by only two communication devices 11 and 12 as shown in FIG. 5, it is possible to simplify transmission of various data between communication devices, thus easily measuring the maximum transmission rate Rmax.

(5) Modified Embodiment of the Transmission Rate Table Generation Process

Figure 8:
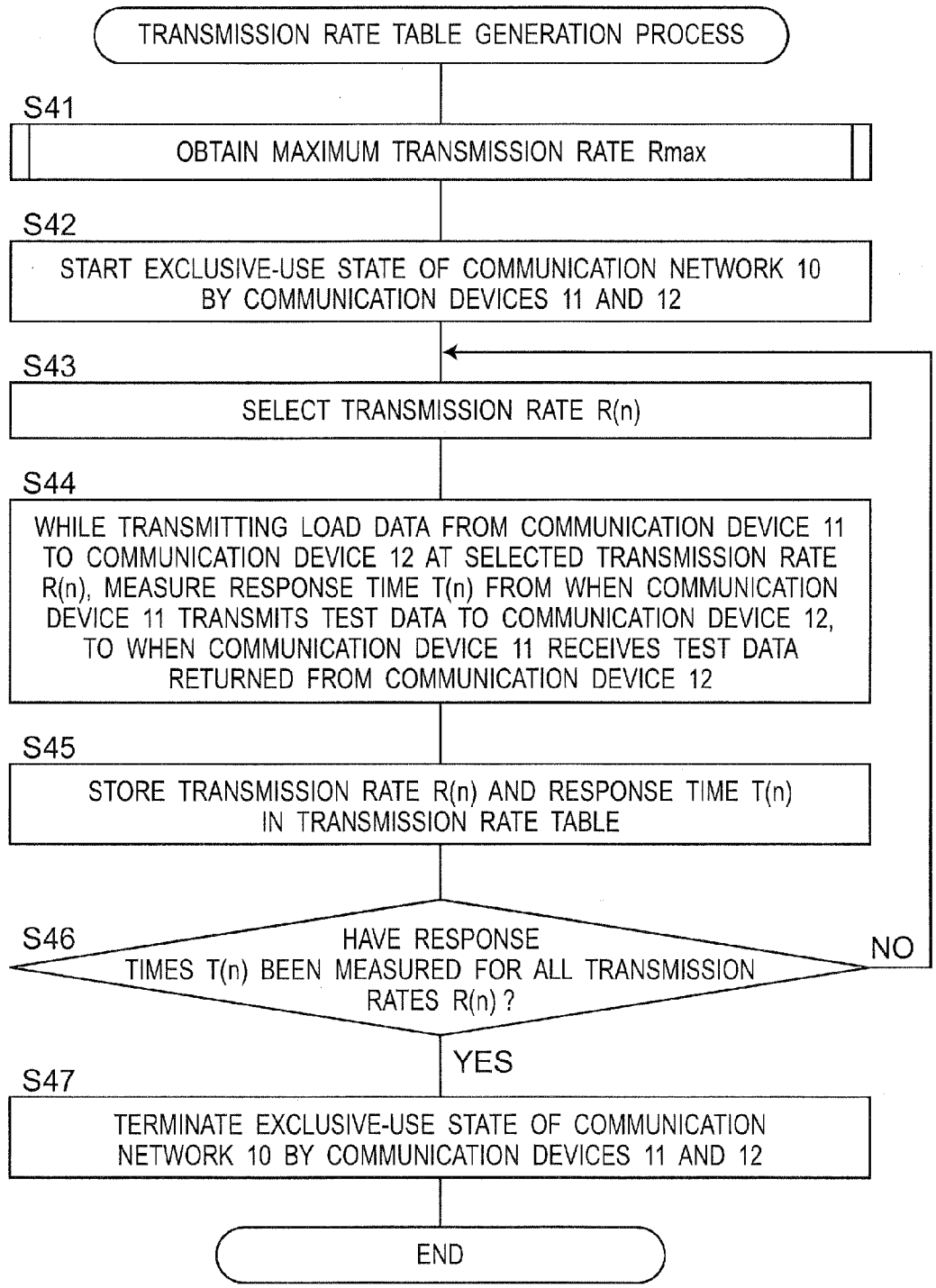
FIG. 8 is a flowchart showing a transmission rate table generation process of a modified embodiment performed by the communication device 11 of FIG. 1.

FIG. 8 is a flowchart showing a transmission rate table generation process of a modified embodiment performed by the communication device 11 of FIG. 1. In the transmission rate table generation process, the load data is not limited to be transmitted between the communication devices 13 and 14, and may be transmitted between the communication devices 11 and 12 (i.e., the same communication devices as those transmitting test data). In this case, it is possible to use an exclusive-use state by only two communication devices 11 and 12, instead of the exclusive-use state by four communication devices 11 to 14 as shown in FIG. 4.

In step S41 of FIG. 8, the interface controller 30 of the communication device 11 obtains a maximum transmission rate Rmax. Step S41 is the same as step S1 of FIG. 4, and specifically, can be performed according to any of the processes of FIGS. 5 to 7. In step S42, the interface controller 30 of the communication device 11 starts an exclusive-use state of the communication network 10 by the communication devices 11 and 12. In step S43, the interface controller 30 of the communication device 11 selects any one of the transmission rates R(n) of FIG. 13. In step S44, while transmitting load data from the communication device 11 to the communication device 12 at the selected transmission rate R(n), the interface controller 30 of the communication device 11 measures a response time T(n) from when the communication device 11 transmits test data to the communication device 12, to when the communication device 11 receives test data returned from the communication device 12. In step S45, the interface controller 30 of the communication device 11 stores the transmission rate R(n) and the response time T(n) in the transmission rate table 29a. In step S46, the interface controller 30 of the communication device 11 determines whether or not response times T(n) have been measured for all the transmission rates R(n); if YES, then the process proceeds to step S47; and if NO, then the process returns to step S43. In step S47, the interface controller 30 of the communication device 11 terminates the exclusive-use state of the communication network 10 by the communication devices 11 and 12.

By using the exclusive-use state by only two communication devices 11 and 12 as shown in FIG. 8, it is possible to simplify transmission of various data between communication devices, thus easily generating the transmission rate table 29a.

(6) Data Transmission Process

Figure 9:
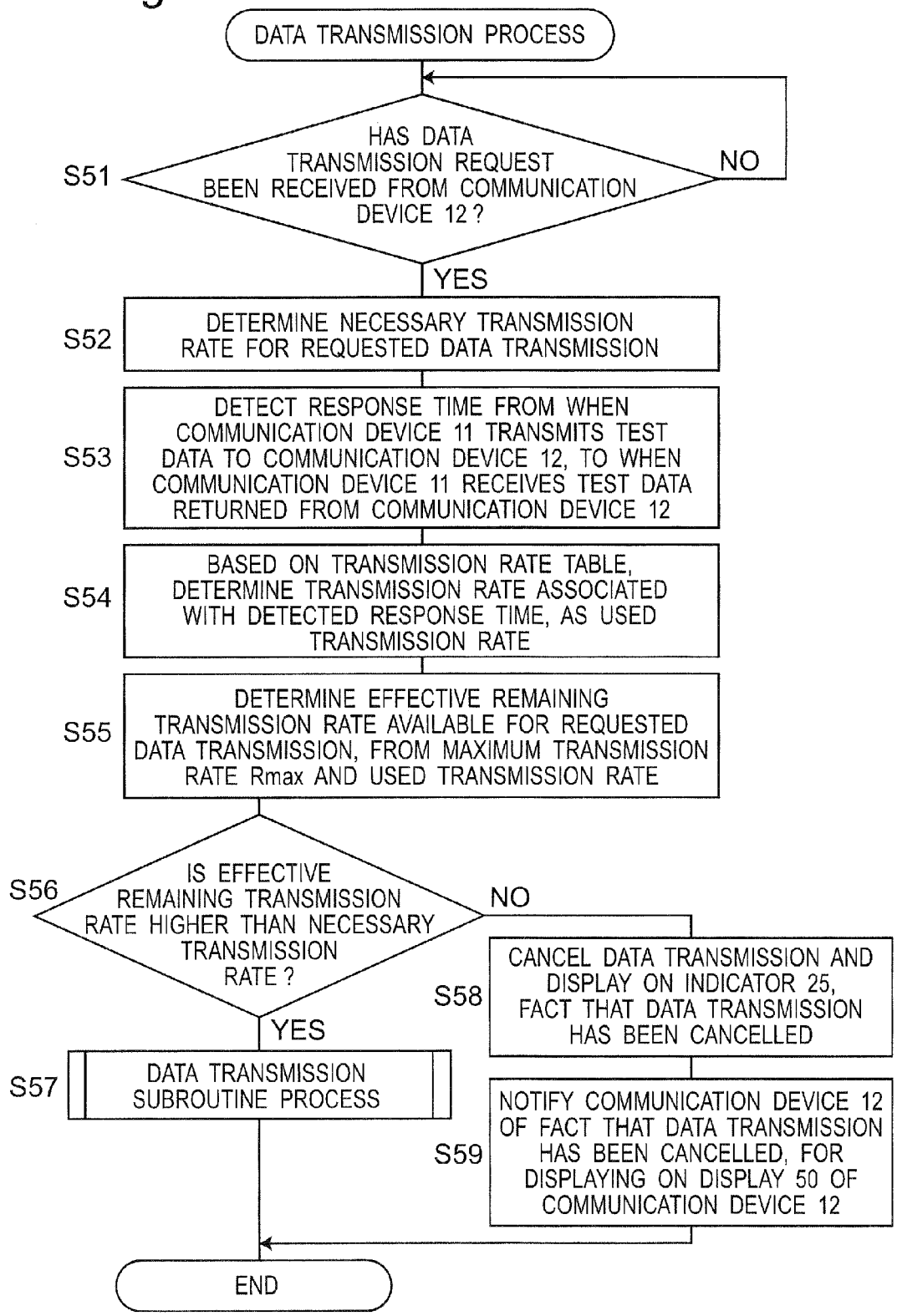
FIG. 9 is a flowchart showing a data transmission process performed by the communication device 11 of FIG. 1.

FIG. 9 is a flowchart showing a data transmission process performed by the communication device 11 of FIG. 1. The process of FIG. 9 is performed for transmitting data (transmission of actual data) from the transmitting communication device 11 to the receiving communication device 12 in response to a request from the receiving communication device 12. The process of FIG. 9 is performed in a non-exclusive-use state of the communication network 10. Therefore, a part of the communication bandwidth (transmission rate) of the communication network 10 may be already used for other communications. The interface controller 30 of the communication device 11 evaluates the used transmission rate using the transmission rate table 29a generated in the transmission rate table generation process of FIG. 4 or 8, checks the traffic conditions of the communication network 10, and determines whether or not actual data can be transmitted.

In step S51 of FIG. 9, the interface controller 30 of the communication device 11 periodically checks whether or not a data transmission request has been received from the communication device 12; if YES, then the process proceeds to step S52. In step S52, the interface controller 30 of the communication device 11 determines a "necessary transmission rate" for transmitting the requested data. The communication device 11 further determines a priority level of actual data to be transmitted.

In step S53, the interface controller 30 of the communication device 11 detects a response time from when the communication device 11 transmits test data to the communication device 12, to when the communication device 11 receives test data returned from the communication device 12. The test data is the same as that transmitted in step S5 of FIG. 4. The priority level of the test data transmitted in step S53 is set to be equal to the priority level of actual data. In the following explanation, it is assumed that the detected response time is, for example, 4 ms. As described above for step S5 of FIG. 4, the interface controller 30 of the communication device 11 may transmit test data a plurality of times between the communication device 11 and the communication device 12 during a certain test period (e.g., 10 seconds). The interface controller 30 may use an average of a plurality of transmission times as a detected response time. Alternatively, the interface controller 30 may use the maximum of a plurality of transmission times as a detected response time. This step S53 is performed to check the traffic conditions of the communication network 10 before transmitting a large amount of actual data in later step S57. The size of the test data is smaller than that of actual data.

In step S54, the interface controller 30 of the communication device 11 determines a transmission rate associated with the detected response time, as the "used transmission rate", based on the transmission rate table 29a. When the detected response time is, for example, 4 ms, the used transmission rate is 30 Mbps based on a data pair for n=3 in FIG. 13. Therefore, the amount of traffic in the communication network 10 in the non-exclusive-use state at the moment when the response time is detected is 30 Mbps.

Figure 14:
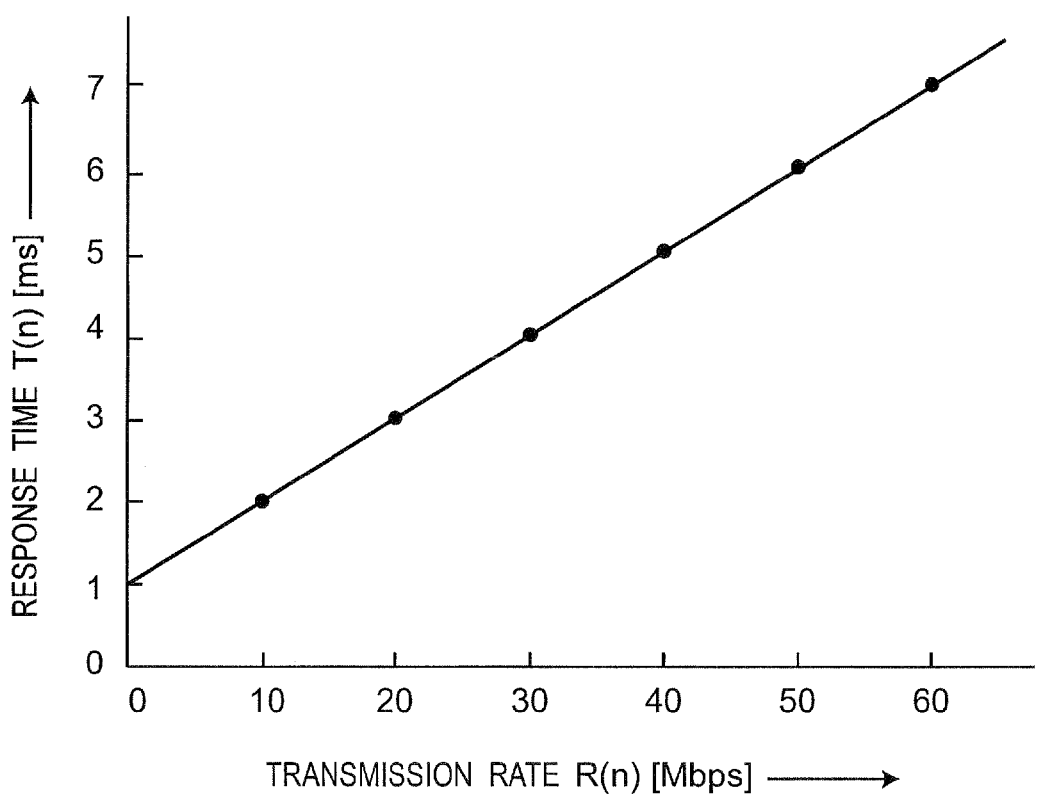
FIG. 14 is a graph showing an example of transmission rates R(n) and response times T(n) which are stored in the transmission rate table 29a of the communication device 11 of FIG. 1.

In general, the response time detected in step S53 may not be identical to any of the plurality of response times T(n) of FIG. 13, and take an intermediate value between 2 to 7 ms. In this case, the interface controller 30 compares interpolated or extrapolated values of the plurality of response times T(n) stored in the transmission rate table 29a, with the response time detected in step S53, to estimate a transmission rate associated with the detected response time. FIG. 14 is a graph showing an example of transmission rates R(n) and response times T(n) which are stored in the transmission rate table 29a of the communication device 11 of FIG. 1. Specifically, the interface controller 30 determines a value identical to the detected response time, from interpolated or extrapolated values of the transmission rates R(n) stored in the transmission rate table 29a, and determines as a used transmission rate, an interpolated or extrapolated value of the response times T(n) in the transmission rate table 29a, associated with the determined interpolated or extrapolated value of the transmission rate R(n). Thus, even if the detected response time is not identical to any of the response times T(n) stored in the transmission rate table 29a, it is possible to more accurately estimate the used transmission rate associated with the detected response time, by using the interpolated or extrapolated values of the response times T(n) and transmission rates R(n) stored in the transmission rate table 29a.

In step S55, the interface controller 30 of the communication device 11 determines an "effective remaining transmission rate" available for transmitting the requested data, based on the maximum transmission rate Rmax and the used transmission rate. The effective remaining transmission rate indicates the amount of additional data which can be transmitted over the communication network 10 where a certain amount of traffic is occurring. The effective remaining transmission rate needs to be sufficiently large to stably transmit actual data. In this case, the "stable transmission" means that when the communication device 12 displays MPEG-2 TS data generated from transmitted actual data, for example, on the display 50, the displayed data is not corrupted and has an approximately the same quality as that of data before transmission. In other words, the "stable transmission" means that actual data can be transmitted without breaking various mechanisms of the communication system 1 for stable transmission.

Specifically, when using, in particular, the TCP protocol, and when data is being stably transmitted, the amount of delay of actual data varies such that the amount of data, e.g., in a buffer memory (not shown) in the network interface 32 is always less than its full capacity. As the transmission rate R(n) increases by flow control of the TCP protocol, the timing in which the network interface 32 transmits actual data is further delayed, and thus, the amount of data in the buffer memory in the network interface 32 increases. However, when data is being stably transmitted, the amount of data in the buffer memory in the network interface 32 does not increase to its full capacity. On the other hand, when using, in particular, the UDP protocol, and when data is being stably transmitted, the error rate of actual data varies so as to be always capable to correct, for example, decoded data of the Reed-Solomon Code of a TS packet. The Reed-Solomon Code is decoded by the TS decoder (not shown) in the signal processing circuit 48.

A criterion for determining whether or not to be capable of stable transmission can be determined when designing the communication device 11 through experiments and simulations, based on the maximum transmission rate Rmax, a transmission rate table (i.e., the correspondence between transmission rates R(n) and response times T(n)), and a detected response time. Such a criterion for determining whether or not to be capable of stable transmission is implemented in the interface controller 30 of the communication device 11.

For example, it is possible to use, as the effective remaining transmission rate, a remaining transmission rate obtained by subtracting the used transmission rate from the maximum transmission rate Rmax. In the above-described example, the effective remaining transmission rate is: 60 Mbps−30 Mbps=30 Mbps. Alternatively, it is possible to use, as the effective remaining transmission rate, a remaining transmission rate obtained by subtracting the used transmission rate and a predetermined margin from the maximum transmission rate Rmax. For the margin, for example, 0 to 10% of the maximum transmission rate Rmax is reserved, taking into account various uncertain situations in the communication network 10. When using 10% of the maximum transmission rate Rmax in the above-described example, the margin is 6 Mbps. Therefore, the effective remaining transmission rate taking into account the margin is: 60 Mbps−30 Mbps 6 Mbps=24 Mbps.

In step S56, the interface controller 30 of the communication device 11 determines whether or not the effective remaining transmission rate is higher than the necessary transmission rate; if YES, then the process proceeds to step S57; and if NO, then the process proceeds to step S58. In other words, the interface controller 30 of the communication device 11 determines whether or not actual data with the necessary transmission rate can be transmitted at a certain priority level, based on the maximum transmission rate Rmax, the transmission rate table 29a (i.e., the correspondence between the transmission rates R(n) and the response times T(n) of FIG. 13), and the response time detected in step S53. If the necessary transmission rate of actual data is 20 Mbps, then in the above-described example, an effective remaining transmission rate taking into account the margin, 24 Mbps, exceeds a necessary transmission rate of the actual data, 20 Mbps, and thus, the communication device 11 starts to stably transmit the actual data.

Since the total amount of traffic in the communication network 10 has to be less than or equal to the maximum transmission rate Rmax, the effective remaining transmission rate has to be higher than at least the necessary transmission rate of actual data. In the case in which a remaining transmission rate obtained by subtracting the used transmission rate from the maximum transmission rate Rmax is used as the effective remaining transmission rate, it is possible to determine to cancel data transmission when stable transmission of actual data is almost impossible, and accordingly, there is almost no possibility of incorrectly determining to cancel the data transmission. On the other hand, in the case in which an effective remaining transmission rate taking into account the margin is used, it is possible to successfully transmit actual data even if the traffic conditions of the communication network 10 is deteriorated by the margin during transmission of the actual data, and thus, it is possible to stably transmit the actual data.

In step S57, the communication device 11 performs a data transmission subroutine process to transmit the actual data which was requested from the communication device 12 in step S51. Details of data transmission will be described later with reference to FIG. 10.

In step S58, the communication device 11 cancels data transmission and displays on the indicator 25, the fact that data transmission has been cancelled. Thus, the user who wishes to receive the actual data can be appropriately notified of the cancellation of data transmission. In step S59, the interface controller 30 of the communication device 11 notifies the communication device 12 of the fact that data transmission has been cancelled, for displaying on the display 50 of the communication device 12, and then the process ends. Thus, the user who wishes to receive actual data can be appropriately notified of the cancellation of data transmission.

Figure 10:
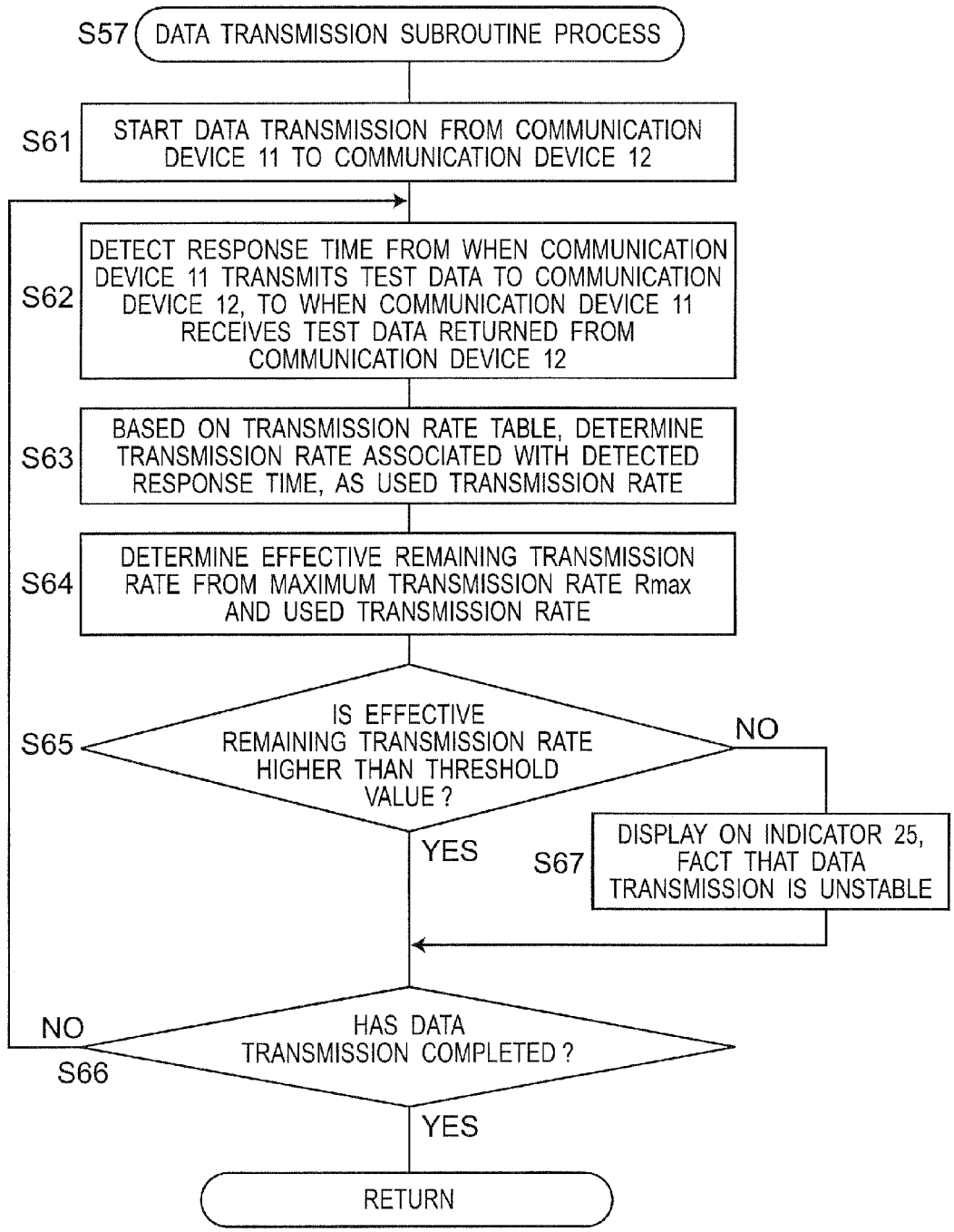
FIG. 10 is a subroutine showing step S57 of FIG. 4.

FIG. 10 is a subroutine showing step S57 of FIG. 9. The interface controller 30 of the communication device 11 may check the traffic conditions of the communication network 10 after starting data transmission. In step S61 of FIG. 10, the communication device 11 starts data transmission from the communication device 11 to the communication device 12. In step S62, the interface controller 30 of the communication device 11 detects a response time from when the communication device 11 transmits test data to the communication device 12, to when the communication device 11 receives test data returned from the communication device 12. In step S63, the interface controller 30 of the communication device 11 determines a transmission rate associated with the detected response time, as a used transmission rate during data transmission, based on the transmission rate table 29a. The used transmission rate deter mined in step S63 also includes the transmission rate of actual data, the transmission of which started in step S61. In step S64, the interface controller 30 of the communication device 11 determines an effective remaining transmission rate during data transmission from the maximum transmission rate Rmax and the used transmission rate.

If the response time detected in step S62 is, for example, 6 ms, then the used transmission rate is 50 Mbps. Therefore, the amount of traffic in the communication network 10 during transmission of actual data is identical to a value obtained by adding a necessary transmission rate of the actual data, 20 Mbps, to an effective remaining transmission rate obtained before transmitting the actual data (not taking into account the margin), 30 Mbps. That is, the amount of traffic in the communication network 10 during transmission of actual data varies as expected before starting transmission. The effective remaining transmission rate during transmission (not taking into account the margin) is: 60-50=10 Mbps.

In step S65, the interface controller 30 of the communication device 11 determines whether or not the effective remaining transmission rate during data transmission is higher than a threshold value; if YES, then the process proceeds to step S66; and if NO, then the process proceeds to step S67. The threshold value of step S65 may be, for example, the same value as the margin of the effective remaining transmission rate described in connection with step S55 (in the above-described example, 6 Mbps).

In step S67, the interface controller 30 of the communication device 11 displays on the indicator 25, the fact that data transmission is unstable, and the process proceeds to step S66. In the above-described example, since an effective remaining transmission rate during transmission, 10 Mbps, exceeds the margin of 6 Mbps, the communication device 11 continues to transmit the actual data. Thus, when the amount of traffic in the communication network 10 increases during transmitting the actual data, and thus, the effective remaining transmission rate decreases, the communication device 11 can alert the user who receives the actual data, that the transmission of the actual data is unstable.

The interface controller 30 of the communication device 11 performs steps S62 to S67 in a predetermined cycle while continuing the data transmission. The cycle is, for example, five minutes.

In the above-described example, the response time obtained in steps S5, S53, etc., is not limited to the average and maximum of a plurality of transmission times obtained when transmitting test data a plurality of times between two communication devices, and the response time may be the minimum of the plurality of transmission times. In particular, a response time T(n) measured in an exclusive-use state (e.g., in step S5 of FIG. 4) may represent the minimum of transmission times, and a response time detected in a non-exclusive-use state (e.g., in step S53 of FIG. 9) may represent the average of transmission times. For example, it is assumed that when a response time T(n) in an exclusive-use state is measured using the minimum of transmission times in step S5 of FIG. 4, a resulting transmission rate table 29a includes data pairs including the transmission rate R(n)=10, 20, 30, 40, 50, and 60 [Mbps] and the response time T(n)=1, 2, 3, 4, 5, and 6 [ms]. In this case, when it is assumed that a response time in a non-exclusive-use state, 4 ms, is detected in step S53 of FIG. 9 using the average of transmission times, the transmission rate associated with the response time is 40 Mbps. Therefore, while the transmission rate is 30 Mbps in the example of FIG. 13, the transmission rate increases by 10 Mbps. Thus, by representing a response time T(n) by the minimum of a plurality of transmission times, it is possible to strictly determine whether or not to be capable of stably transmit actual data, taking into account the maximum of the amount of traffic in the communication network 10, and thus, it is possible to more reliably achieve stable transmission of actual data.

In the above-described example, it is described that the communication devices 11 to 14 perform their respective individual steps and processes. However, each of the communication devices 11 to 14 may be provided with a program causing each of the communication devices 11 to 14 to perform at least some or all of the individual steps and processes. For example, the communication device 11 may be provided with a program causing the communication device 13 to perform the above-described steps and processes, so that the program is integrated with a program of the communication device 11 itself. The communication device 13 may also be provided with such an integrated program. For example, the communication device 12 may be provided with a program causing the communication device 14 to perform the above-described steps and processes, so that the program is integrated with a program of the communication device 12 itself. The communication device 14 may also be provided with such an integrated program. Thus, in the above-described example, the communication device 11 and the communication device 13 can be manufactured to the same specifications, and the communication device 12 and the communication device 14 can be manufactured to the same specifications. For example, the interface controller 30 is provided with the above-described program to be provided on each of the communication devices 11 and 13, and the interface controller 43 is provided with the above-described program to be provided on each of the communication devices 12 and 14.

In general, a wireless environment may vary per pair of communication devices, each of the communication devices 11 to 16 needs to perform a transmission rate table generation process of FIG. 4 or 8. However, if the communication devices 11 to 16 are devices of the same type, then the contents of a transmission rate table generated by any one of the communication devices may be copied to the other communication devices.

(7) Conclusions

Thus, for example, when the communication device 11 is installed in the communication system 1, an exclusive-use state by the communication devices 11 and 12 or the communication devices 11 to 14 is started, and the traffic conditions of the communication network 10 are checked using a large amount of load data to generate a transmission rate table 29a (i.e., the correspondence between transmission rates R(n) and response times T(n)). Thereafter, when a large amount of actual data is transmitted in a non-exclusive-use state, the communication device 11 detects a response time using a small amount of test data before transmitting actual data, and thus, determines whether or not to be capable of starting stable transmission of actual data. Therefore, before transmitting actual data, it is only necessary to transmit a small amount of test data for detecting the response time. Thus, it is possible to minimize an amount of extra traffic to the communication network 10, as compared to the case in which load data is transmitted. As a result, even in a non-exclusive-use state, test data does not interfere other communications, and the test period before transmitting the actual data can be significantly reduced to, for example, about 10 seconds or less. Even if such test data is transmitted every time before transmitting actual data, the transmission of test data does not impose any burden on a user who receives the actual data.

Further, by establishing an exclusive-use state by two communication devices 11 and 12, it is possible to simplify the transmission of various data among the communication devices, and thus, easily check the transmission rate table 29a and the maximum transmission rate Rmax.

The numbers indicated above are examples for specifically describing the embodiments, and thus, the technique disclosed in this specification is not limited to the exemplary numbers. The steps in the flowcharts may be performed in a different order than that described above, without departing from the sprit of the technique disclosed in this specification, and some of all steps in a plurality of flowcharts may be reconfigured by different combinations than those in the above-described flowcharts. Thus, it is advantageously use different orders or different combinations. By reconfiguring some of all components in the above-described embodiments by different combinations than those in the above-described embodiments, without departing from the spirit of technique disclosed in this specification, it is advantageously use different combinations.

All the embodiments described above exemplifies the technique disclosed in this specification. The technique disclosed in this specification is not limited to these examples, and can be developed to various examples which can be easily configured by those skilled in the art using the technique disclosed in this specification.

A communication system and a communication method according to the present disclosure are configured as follow.

According to the first aspect of the present disclosure, there is provided a communication system that includes a plurality of communication devices including at least a first communication device and a second communication device, and connected to each other through a communication network.

The first communication device is configured to store a transmission rate table in a storage device, the transmission rate table including first response times, and transmission rates associated with the first response times, each of the first response times indicating a length of time for transmitting test data, whose size is smaller than a size of load data, between the first and second communication devices, while transmitting the load data between any pair of communication devices among the plurality of communication devices at one of a plurality of different transmission rates. When transmitting actual data from the first communication device to the second communication device, the first communication device is configured to: determine a necessary transmission rate for transmitting the actual data; detect a second response time indicating a length of time for transmitting the test data between the first and second communication devices; determine a transmission rate associated with the second response time, as a used transmission rate, based on the transmission rate table; determine an effective remaining transmission rate of the communication network available to transmit the actual data, based on a maximum transmission rate of the communication network and the used transmission rate; and start transmission of the actual data when the effective remaining transmission rate is higher than the necessary transmission rate.

According to the second aspect of the present disclosure, in the first aspect of the present disclosure, the first communication device is configured to obtain the maximum transmission rate. The first and second communication devices are configured to start an exclusive-use state where only the first and second communication devices communicate with each other over the communication network. In the exclusive-use state, the first communication device is configured to: measure the first response times by transmitting the test data between the first and second communication devices, while transmitting the load data at the plurality of different transmission rates between the first and second communication devices; and store the first response times, and the transmission rates of the load data associated with the first response times, in the transmission rate table.

According to the third aspect of the present disclosure, in the first aspect of the present disclosure, the first communication device is configured to obtain the maximum transmission rate. The first communication device, the second communication device, a third communication device, and a fourth communication device are configured to start an exclusive-use state where only the first communication device, the second communication device, the third communication device, and the fourth communication device communicate with each other over the communication network. In the exclusive-use state, the first communication device is configured to: measure the first response times by transmitting the test data between the first and second communication devices, while transmitting the load data at the plurality of different transmission rates between the third and fourth communication devices; and store the first response times, and the transmission rates of the load data associated with the first response times, in the transmission rate table.

According to the fourth aspect of the present disclosure, in the second or third aspect of the present disclosure, the first and second communication devices are configured to start an exclusive-use state where only the first and second communication devices communicate with each other over the communication network. The first communication device is configured to measure the maximum transmission rate by transmitting load data between the first and second communication devices.

According to the fifth aspect of the present disclosure, in the third aspect of the present disclosure, the third and fourth communication devices are configured to start an exclusive-use state where only the third and fourth communication devices communicate with each other over the communication network. The third communication device is configured to measure the maximum transmission rate by transmitting load data between the third and fourth communication devices. The first communication device is configured to obtain the maximum transmission rate from the third communication device.

According to the sixth aspect of the present disclosure, in the third aspect of the present disclosure, the first and second communication devices are configured to start an exclusive-use state where only the first and second communication devices communicate with each other over the communication network. The first communication device is configured to measure the maximum transmission rate by transmitting load data between the first and second communication devices. The third and fourth communication devices are configured to start an exclusive-use state where only the third and fourth communication devices communicate with each other the communication network. The third communication device is configured to measure the maximum transmission rate by transmitting load data between the third and fourth communication devices.

According to the seventh aspect of the present disclosure, in any one of the second to sixth aspects of the present disclosure, the first communication device is configured to measure the first response times by obtaining an average length of times for transmitting the test data a plurality of times between the first and second communication devices.

According to the eighth aspect of the present disclosure, in any one of the second to sixth aspects of the present disclosure, the first communication device is configured to measure the first response times by obtaining a maximum length of times for transmitting the test data a plurality of times between the first and second communication devices.

According to the ninth aspect of the present disclosure, in any one of the second to sixth aspects of the present disclosure, the first communication device is configured to measure the first response times by obtaining a minimum length of times for transmitting the test data a plurality of times between the first and second communication devices.

According to the tenth aspect of the present disclosure, in any one of the first to ninth aspects of the present disclosure, the first communication device is configured to detect the second response time by obtaining an average length of times for transmitting the test data a plurality of times between the first and second communication devices.

According to the 11th aspect of the present disclosure, in any one of the first to ninth aspects of the present disclosure, the first communication device is configured to detect the second response time by obtaining a maximum length of times for transmitting the test data a plurality of times between the first and second communication devices.

According to the 12th aspect of the present disclosure, in any one of the first to 11th aspects of the present disclosure, the first communication device is configured to: compare interpolated or extrapolated values of the first response times and the transmission rates stored in the transmission rate table, with the second response time, and determine a transmission rate associated with the second response time, as the used transmission rate.

According to the 13th aspect of the present disclosure, in any one of the first to 12th aspects of the present disclosure, the effective remaining transmission rate is a remaining transmission rate obtained by subtracting the used transmission rate from the maximum transmission rate.

According to the 14th aspect of the present disclosure, in any one of the first to 12th aspects of the present disclosure, the effective remaining transmission rate is a remaining transmission rate obtained by subtracting the used transmission rate and a predetermined margin from the maximum transmission rate.

According to the 15th aspect of the present disclosure, in any one of the first to 15th aspects of the present disclosure, the first communication device is provided with a first indicator. When the effective remaining transmission rate is less than or equal to the necessary transmission rate, the first communication device is configured to: cancel the transmission of the actual data, and display on the first indicator, a fact that the transmission of the actual data has been cancelled.

According to the 16th aspect of the present disclosure, in the 15th aspects of the present disclosure, after starting the transmission of the actual data, the first communication device is configured to: detect a third response time indicating a length of time for transmitting the test data, while transmitting the actual data between the first and second communication devices; determine a transmission rate associated with the third response time, as a used transmission rate, based on the transmission rate table; determine the effective remaining transmission rate based on the maximum transmission rate of the communication network and the used transmission rate; and display on the first indicator, a fact that the transmission of the actual data is unstable, when the effective remaining transmission rate is less than or equal to a predetermined threshold value.

According to the 17th aspect of the present disclosure, in any one of the first to 16th aspects of the present disclosure, when the effective remaining transmission rate is less than or equal to the necessary transmission rate, the first communication device is configured to: cancel the transmission of the actual data, and notify the second communication device of a fact that the transmission of the actual data has been cancelled. The second communication device is provided with a second indicator; and wherein the second communication device is configured to display on the second indicator, a fact that the transmission of the actual data has been cancelled.

According to the 18th aspect of the present disclosure, there is provided a communication method of a communication system that includes a plurality of communication devices including at least a first communication device and a second communication device, and connected to each other through a communication network. The first communication device is configured to store a transmission rate table in a storage device, the transmission rate table including first response times, and transmission rates associated with the first response times, each of the first response times indicating a length of time for transmitting test data, whose size is smaller than a size of load data, between the first and second communication devices, while transmitting the load data between any pair of communication devices among the plurality of communication devices at one of a plurality of different transmission rates. When transmitting actual data from the first communication device to the second communication device, the communication method includes: by the first communication device, determining a necessary transmission rate for transmitting the actual data; detecting a second response time indicating a length of time for transmitting the test data between the first and second communication devices; determining a transmission rate associated with the second response time, as a used transmission rate, based on the transmission rate table; determining an effective remaining transmission rate of the communication network available to transmit the actual data, based on a maximum transmission rate of the communication network and the used transmission rate; and starting transmission of the actual data when the effective remaining transmission rate is higher than the necessary transmission rate.

According to the 19th aspect of the present disclosure, in the 18th aspects of the present disclosure, the communication method further includes: by the first communication device, obtaining the maximum transmission rate, starting an exclusive-use state where only the first and second communication devices communicate with each other over the communication network. In the exclusive-use state, the method further includes: by the first communication device, measuring the first response times by transmitting the test data between the first and second communication devices, while transmitting the load data at the plurality of different transmission rates between the first and second communication devices; and by the first communication device, storing the first response times, and the transmission rates of the load data associated with the first response times, in the transmission rate table.

According to the 20th aspect of the present disclosure, in the 18th aspects of the present disclosure, the communication method further includes: by the first communication device, obtaining the maximum transmission rate, starting an exclusive-use state where only the first communication device, the second communication device, a third communication device, and a fourth communication device communicate with each other over the communication network. In the exclusive-use state, the method further includes: by the first communication device, measuring the first response times by transmitting the test data between the first and second communication devices, while transmitting the load data at the plurality of different transmission rates between the third and fourth communication devices; and by the first communication device, storing the first response times, and the transmission rates of the load data associated with the first response times, in the transmission rate table.

According to the 21st aspect of the present disclosure, in the 19th or 20th aspects of the present disclosure, the communication method further includes: starting an exclusive-use state where only the first and second communication devices communicate with each other over the communication network, and by the first communication device, measuring the maximum transmission rate by transmitting load data between the first and second communication devices.

According to the 22nd aspect of the present disclosure, in the 20th aspects of the present disclosure, the communication method further includes: starting an exclusive-use state where only the third and fourth communication devices communicate with each other over the communication network, measuring the maximum transmission rate by transmitting load data between the third and fourth communication devices, and by the first communication device, obtaining the maximum transmission rate from the third communication device.

According to the 23rd aspect of the present disclosure, in the 20th aspects of the present disclosure, the communication method further includes: starting an exclusive-use state where only the first and second communication devices communicate with each other over the communication network, by the first communication device, measuring the maximum transmission rate by transmitting load data between the first and second communication devices, starting an exclusive-use state where only the third and fourth communication devices communicate with each other the communication network, and by the third communication device, measuring the maximum transmission rate by transmitting load data between the third and fourth communication devices.

According to the 24th aspect of the present disclosure, in any one of the 19th to 23rd aspects of the present disclosure, the communication method further includes: by the first communication device, measuring the first response times by obtaining an average length of times for transmitting the test data a plurality of times between the first and second communication devices.

According to the 25th aspect of the present disclosure, in any one of the 19th to 23rd aspects of the present disclosure, the communication method further includes: by the first communication device, measuring the first response times by obtaining a maximum length of times for transmitting the test data a plurality of times between the first and second communication devices.

According to the 26th aspect of the present disclosure, in any one of the 19th to 23rd aspects of the present disclosure, the communication method further includes: by the first communication device, measuring the first response times by obtaining a minimum length of times for transmitting the test data a plurality of times between the first and second communication devices.

According to the 27th aspect of the present disclosure, in any one of the 18th to 26th aspects of the present disclosure, the communication method further includes: by the first communication device, detecting the second response time by obtaining an average length of times for transmitting the test data a plurality of times between the first and second communication devices.

According to the 28th aspect of the present disclosure, in any one of the 18th to 26th aspects of the present disclosure, the communication method further includes: by the first communication device, detecting the second response time by obtaining a maximum length of times for transmitting the test data a plurality of times between the first and second communication devices.

According to the 29th aspect of the present disclosure, in any one of the 18th to 28th aspects of the present disclosure, the communication method further includes: by the first communication device, comparing interpolated or extrapolated values of the first response times and the transmission rates stored in the transmission rate table, with the second response time, and determining a transmission rate associated with the second response time, as the used transmission rate.

According to the 30th aspect of the present disclosure, in any one of the 18th to 29th aspects of the present disclosure, the effective remaining transmission rate is a remaining transmission rate obtained by subtracting the used transmission rate from the maximum transmission rate.

According to the 31st aspect of the present disclosure, in any one of the 18th to 29th aspects of the present disclosure, the effective remaining transmission rate is a remaining transmission rate obtained by subtracting the used transmission rate and a predetermined margin from the maximum transmission rate.

According to the 32nd aspect of the present disclosure, in any one of the 18th to 31st aspects of the present disclosure, the first communication device is provided with a first indicator. When the effective remaining transmission rate is less than or equal to the necessary transmission rate, the communication method further includes: by the first communication device, cancel the transmission of the actual data, and display on the first indicator, a fact that the transmission of the actual data has been cancelled.

According to the 33rd aspect of the present disclosure, in the 32nd aspects of the present disclosure, the communication method further includes: after starting the transmission of the actual data, by the first communication device, detecting a third response time indicating a length of time for transmitting the test data, while transmitting the actual data between the first and second communication devices; by the first communication device, determining a transmission rate associated with the third response time, as a used transmission rate, based on the transmission rate table; by the first communication device, determining the effective remaining transmission rate based on the maximum transmission rate of the communication network and the used transmission rate; and by the first communication device, displaying on the first indicator, a fact that the transmission of the actual data is unstable, when the effective remaining transmission rate is less than or equal to a predetermined threshold value.

According to the 34th aspect of the present disclosure, in any one of the 18th to 33rd aspects of the present disclosure, the second communication device is provided with a second indicator. When the effective remaining transmission rate is less than or equal to the necessary transmission rate, the communication method further includes: by the first communication device, cancelling the transmission of the actual data, and notifying the second communication device of a fact that the transmission of the actual data has been cancelled, and by the second communication device, displaying on the second indicator, a fact that the transmission of the actual data has been cancelled.

The technique disclosed in this specification can be used as a communication technique for reliable streaming in a shared network environment such as a home network.

The invention claimed is:

1. A communication system for use with a communication network, said communication system comprising:
a plurality of communication devices, including a processor and memory, to be connected to each other through the communication network,
said plurality including at least a first communication device and a second communication device;
wherein the first communication device is configured to:
transmit load data between said first communication device and any other communication device among said plurality of communication devices at a plurality of difference transmission rates,
measure first response times, each of the first response times indicating a length of time for transmitting test data, whose size is smaller than a size of the load data, between the first and second communication devices at one of the plurality of different transmission rates, and
store a transmission rate table in a storage device, the transmission rate table including the first response times, and the transmission rates associated with the first response times, respectively, and
wherein, the first communication device is configured to, when transmitting actual data from the first communication device to the second communication device:
determine a necessary transmission rate for transmitting the actual data;
detect a second response time indicating a length of time for transmitting the test data between the first and second communication devices;
determine a transmission rate associated with the second response time, as a used transmission rate, based on the transmission rate table;
determine an effective remaining transmission rate of the communication network available to transmit the actual data, based on a maximum transmission rate of the communication network and the used transmission rate, the effective remaining transmission rate being a transmission rate indicating an amount of additional data which can be transmitted over the communication network where traffic is occurring; and start transmission of the actual data when the effective remaining transmission rate is higher than the necessary transmission rate.

2. The communication system as claimed in claim 1, wherein the first communication device is configured to obtain the maximum transmission rate, wherein the first and second communication devices are configured to start an exclusive-use state where only the first and second communication devices communicate with each other over the communication network, and wherein the first communication device is configured to, in the exclusive-use state:

measure the first response times by transmitting the test data between the first and second communication devices, while transmitting the load data at the plurality of different transmission rates between the first and second communication devices; and store the first response times, and the transmission rates of the load data associated with the first response times, in the transmission rate table.

3. The communication system as claimed in claim 1, wherein said plurality of communication devices further comprises a third communication device and a fourth communication device, wherein the first communication device is configured to obtain the maximum transmission rate, wherein the first communication device, the second communication device, the third communication device, and the fourth communication device are configured to start an exclusive-use state where only the first communication device, the second communication device, the third communication device, and the fourth communication device communicate with each other over the communication network, and wherein the first communication device is configured to, in the exclusive-use state:

measure the first response times by transmitting the test data between the first and second communication devices, while transmitting the load data at the plurality of different transmission rates between the third and fourth communication devices; and store the first response times, and the transmission rates of the load data associated with the first response times, in the transmission rate table.

4. The communication system as claimed in claim 2, wherein the first and second communication devices are configured to start an exclusive-use state where only the first and second communication devices communicate with each other over the communication network, and wherein the first communication device is configured to measure the maximum transmission rate by transmitting load data between the first and second communication devices.

5. The communication system as claimed in claim 3, wherein the third and fourth communication devices are configured to start an exclusive-use state where only the third and fourth communication devices communicate with each other over the communication network, wherein the third communication device is configured to measure the maximum transmission rate by transmitting load data between the third and fourth communication devices, and wherein the first communication device is configured to obtain the maximum transmission rate from the third communication device.

6. The communication system as claimed in claim 3, wherein the first and second communication devices are configured to start an exclusive-use state where only the first and second communication devices communicate with each other over the communication network, wherein the first communication device is configured to measure the maximum transmission rate by transmitting load data between the first and second communication devices, wherein the third and fourth communication devices are configured to start an exclusive-use state where only the third and fourth communication devices communicate with each other over the communication network, and wherein the third communication device is configured to measure the maximum transmission rate by transmitting load data between the third and fourth communication devices.

7. The communication system as claimed in claim 2, wherein the first communication device is configured to measure the first response times by obtaining an average length of times for transmitting the test data a plurality of times between the first and second communication devices.

8. The communication system as claimed in claim 2, wherein the first communication device is configured to measure the first response times by obtaining a maximum length of times for transmitting the test data a plurality of times between the first and second communication devices.

9. The communication system as claimed in claim 2, wherein the first communication device is configured to measure the first response times by obtaining a minimum length of times for transmitting the test data a plurality of times between the first and second communication devices.

10. The communication system as claimed in claim 1, wherein the first communication device is configured to detect the second response time by obtaining an average length of times for transmitting the test data a plurality of times between the first and second communication devices.

11. The communication system as claimed in claim 1, wherein the first communication device is configured to detect the second response time by obtaining a maximum length of times for transmitting the test data a plurality of times between the first and second communication devices.

12. The communication system as claimed in claim 1, wherein the first communication device is configured to:

compare interpolated or extrapolated values of the first response times and the transmission rates stored in the transmission rate table, with the second response time, and determine a transmission rate associated with the second response time, as the used transmission rate.

13. The communication system as claimed in claim 1, wherein the effective remaining transmission rate is a remaining transmission rate obtained by subtracting the used transmission rate from the maximum transmission rate.

14. The communication system as claimed in claim 1, wherein the effective remaining transmission rate is a remaining transmission rate obtained by subtracting the used transmission rate and a predetermined margin from the maximum transmission rate.

15. The communication system as claimed in claim 1,
wherein the first communication device is provided with a first indicator; and
wherein the first communication device is configured to, when the effective remaining transmission rate is less than or equal to the necessary transmission rate:
cancel the transmission of the actual data, and
display on the first indicator, a fact that the transmission of the actual data has been cancelled.

16. The communication system as claimed in claim 15,
wherein the first communication device is configured to, after starting the transmission of the actual data:
detect a third response time indicating a length of time for transmitting the test data, while transmitting the actual data between the first and second communication devices;
determine a transmission rate associated with the third response time, as a used transmission rate, based on the transmission rate table;
determine the effective remaining transmission rate based on the maximum transmission rate of the communication network and the used transmission rate; and
display on the first indicator, a fact that the transmission of the actual data is unstable, when the effective remaining transmission rate is less than or equal to a predetermined threshold value.

17. The communication system as claimed in claim 1,
wherein the first communication device is configured to, when the effective remaining transmission rate is less than or equal to the necessary transmission rate:
cancel the transmission of the actual data, and
notify the second communication device of a fact that the transmission of the actual data has been cancelled, and
wherein the second communication device is provided with a second indicator; and
wherein the second communication device is configured to display on the second indicator, a fact that the transmission of the actual data has been cancelled.

* * * * *